US012651488B2

(12) United States Patent
Wang

(10) Patent No.: US 12,651,488 B2
(45) Date of Patent: Jun. 9, 2026

(54) EFFICIENT FEATURE REDUCTION FOR COMPONENT FAULT PREDICTION

(71) Applicant: The Boeing Company, Chicago, IL (US)

(72) Inventor: Changzhou Wang, Bellevue, WA (US)

(73) Assignee: THE BOEING COMPANY, Arlington, VA (US)

( * ) Notice: Subject to any disclaimer, the term of this patent is extended or adjusted under 35 U.S.C. 154(b) by 473 days.

(21) Appl. No.: 17/588,429

(22) Filed: Jan. 31, 2022

(65) Prior Publication Data

US 2023/0245507 A1      Aug. 3, 2023

(51) Int. Cl.
| | |
|---|---|
| *B64F 5/60* | (2017.01) |
| *G07C 5/00* | (2006.01) |
| *G07C 5/08* | (2006.01) |

(52) U.S. Cl.
CPC .............. *G07C 5/0808* (2013.01); *B64F 5/60* (2017.01); *G07C 5/006* (2013.01); *G07C 5/0825* (2013.01)

(58) Field of Classification Search
CPC .... G07C 5/0808; G07C 5/006; G07C 5/0825; B64F 5/60; G06Q 10/20; G06F 3/0481; G06F 3/0484
See application file for complete search history.

(56) References Cited

U.S. PATENT DOCUMENTS

| | | | | |
|---|---|---|---|---|
| 2014/0088821 A1* | 3/2014 | Per-Aake | ........... | G05B 23/0216 |
| 2016/0180610 A1* | 6/2016 | Anurag | ................... | G06Q 10/20 |
| 2019/0080524 A1* | 3/2019 | Brian | ........................ | B64F 5/60 |
| 2020/0391884 A1* | 12/2020 | Megan | ...................... | B64F 5/60 |

FOREIGN PATENT DOCUMENTS

WO      WO20170051032 A1 *    3/2017    ......... G05B 23/0283

* cited by examiner

*Primary Examiner* — Rachid Bendidi
*Assistant Examiner* — Kirsten Jade M Santos
(74) *Attorney, Agent, or Firm* — COATS & BENNETT, PLLC

(57) ABSTRACT

A phased approach to predicting whether a component currently installed on a vehicle should be removed is provided. In a first phase, a prediction model is created using historical data and sample values that are associated with a vehicle component previously removed from the vehicle. In a second phase, the output of the prediction model is used to predict whether the selected vehicle component currently installed on the vehicle should be removed. Based on the prediction, a graphical user interface (GUI) is generated for output to a user. The GUI visually indicates the vehicle component predicted to be removed and provides a recommendation for addressing the predicted removal of the component.

25 Claims, 14 Drawing Sheets

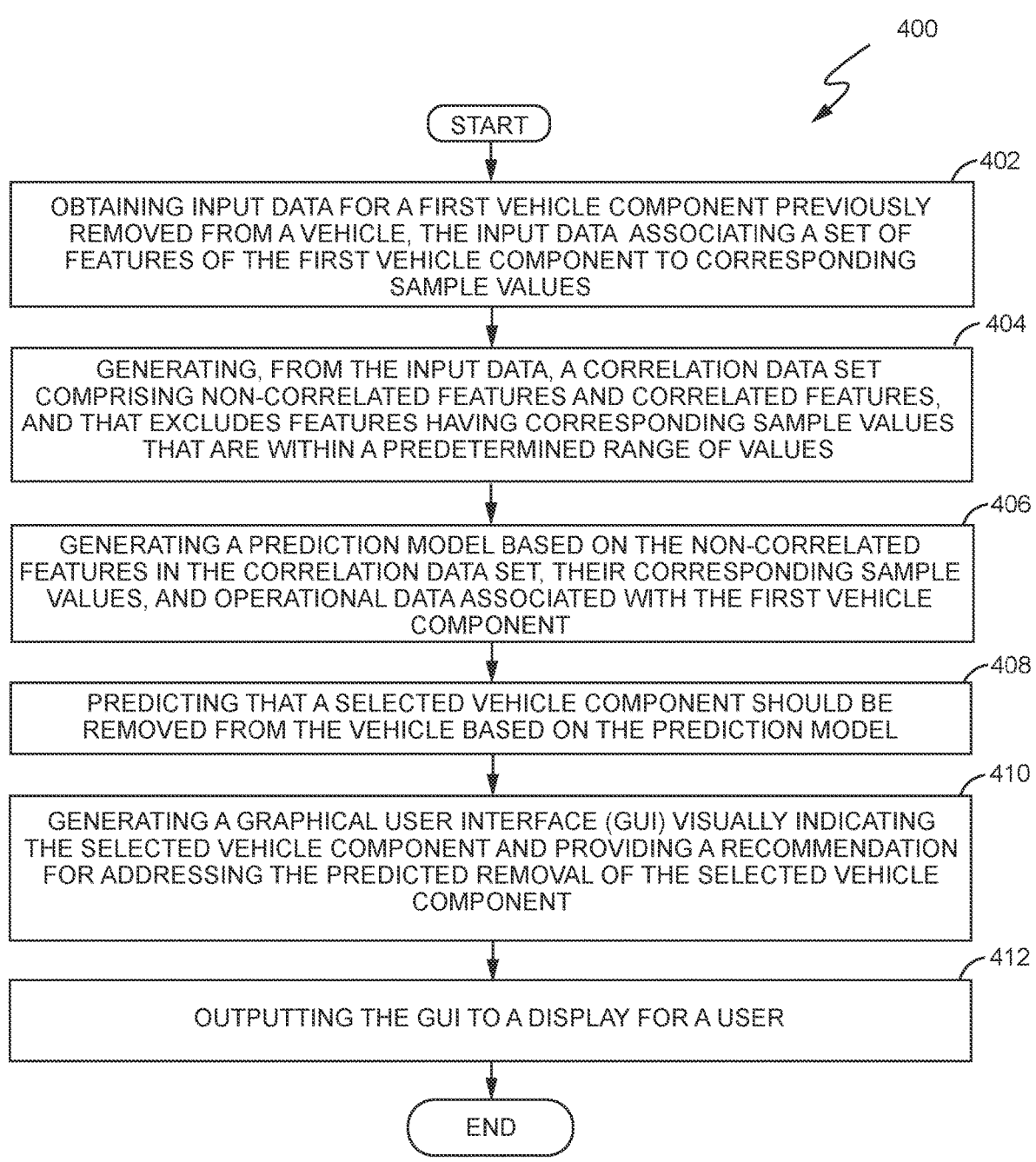

400

START

402

OBTAINING INPUT DATA FOR A FIRST VEHICLE COMPONENT PREVIOUSLY REMOVED FROM A VEHICLE, THE INPUT DATA ASSOCIATING A SET OF FEATURES OF THE FIRST VEHICLE COMPONENT TO CORRESPONDING SAMPLE VALUES

404

GENERATING, FROM THE INPUT DATA, A CORRELATION DATA SET COMPRISING NON-CORRELATED FEATURES AND CORRELATED FEATURES, AND THAT EXCLUDES FEATURES HAVING CORRESPONDING SAMPLE VALUES THAT ARE WITHIN A PREDETERMINED RANGE OF VALUES

406

GENERATING A PREDICTION MODEL BASED ON THE NON-CORRELATED FEATURES IN THE CORRELATION DATA SET, THEIR CORRESPONDING SAMPLE VALUES, AND OPERATIONAL DATA ASSOCIATED WITH THE FIRST VEHICLE COMPONENT

408

PREDICTING THAT A SELECTED VEHICLE COMPONENT SHOULD BE REMOVED FROM THE VEHICLE BASED ON THE PREDICTION MODEL

410

GENERATING A GRAPHICAL USER INTERFACE (GUI) VISUALLY INDICATING THE SELECTED VEHICLE COMPONENT AND PROVIDING A RECOMMENDATION FOR ADDRESSING THE PREDICTED REMOVAL OF THE SELECTED VEHICLE COMPONENT

412

OUTPUTTING THE GUI TO A DISPLAY FOR A USER

END

FIG. 4

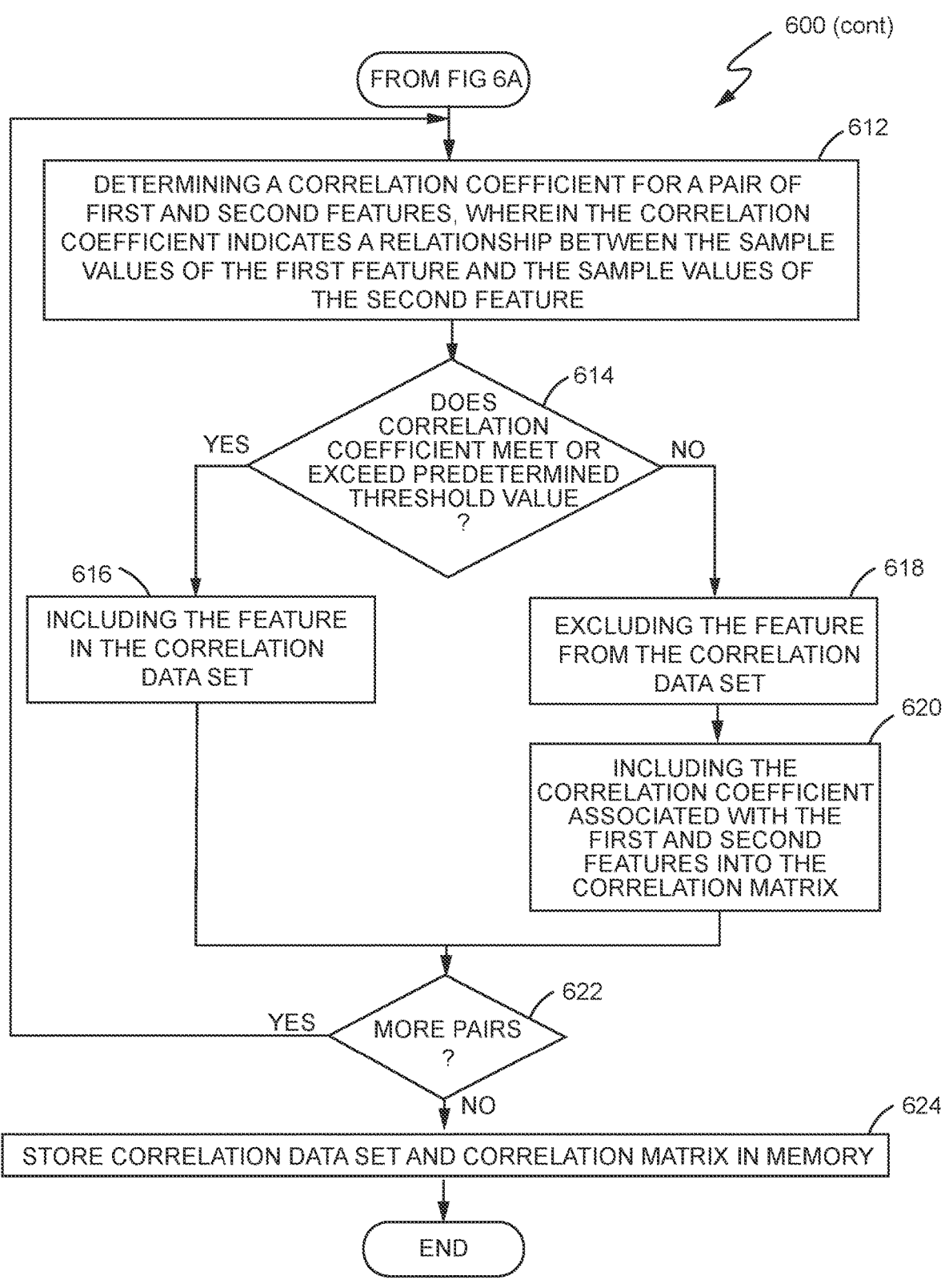

600 (cont)

FROM FIG 6A

612

DETERMINING A CORRELATION COEFFICIENT FOR A PAIR OF
FIRST AND SECOND FEATURES, WHEREIN THE CORRELATION
COEFFICIENT INDICATES A RELATIONSHIP BETWEEN THE SAMPLE
VALUES OF THE FIRST FEATURE AND THE SAMPLE VALUES OF
THE SECOND FEATURE

614

DOES
CORRELATION
COEFFICIENT MEET OR
EXCEED PREDETERMINED
THRESHOLD VALUE
?

YES                                             NO

616

INCLUDING THE FEATURE
IN THE CORRELATION
DATA SET

618

EXCLUDING THE FEATURE
FROM THE CORRELATION
DATA SET

620

INCLUDING THE
CORRELATION COEFFICIENT
ASSOCIATED WITH THE
FIRST AND SECOND
FEATURES INTO THE
CORRELATION MATRIX

622

YES          MORE PAIRS
?

NO          624

STORE CORRELATION DATA SET AND CORRELATION MATRIX IN MEMORY

END

FIG. 6B

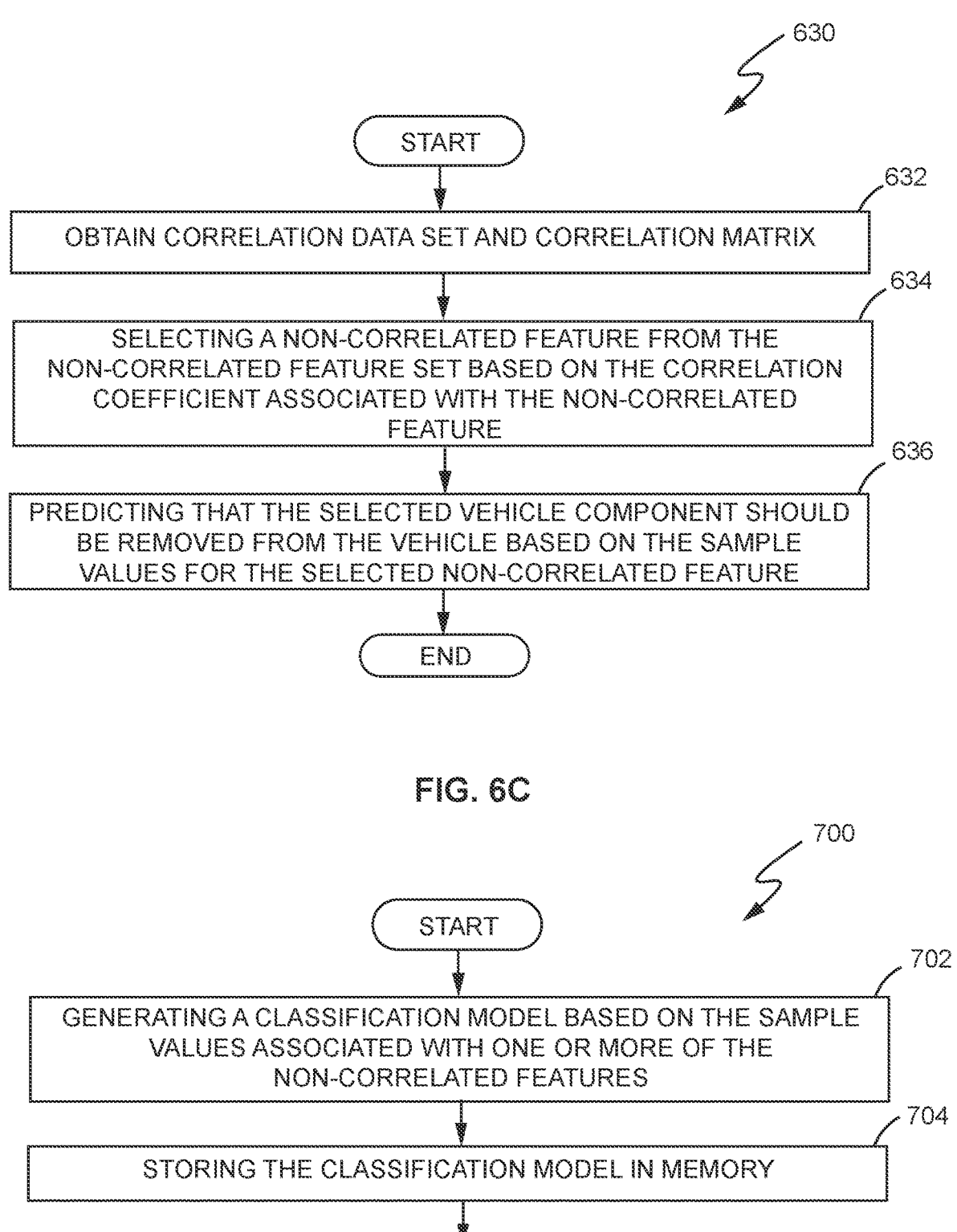

630

START

632

OBTAIN CORRELATION DATA SET AND CORRELATION MATRIX

634

SELECTING A NON-CORRELATED FEATURE FROM THE NON-CORRELATED FEATURE SET BASED ON THE CORRELATION COEFFICIENT ASSOCIATED WITH THE NON-CORRELATED FEATURE

636

PREDICTING THAT THE SELECTED VEHICLE COMPONENT SHOULD BE REMOVED FROM THE VEHICLE BASED ON THE SAMPLE VALUES FOR THE SELECTED NON-CORRELATED FEATURE

END

START

702

GENERATING A CLASSIFICATION MODEL BASED ON THE SAMPLE VALUES ASSOCIATED WITH ONE OR MORE OF THE NON-CORRELATED FEATURES

704

STORING THE CLASSIFICATION MODEL IN MEMORY

END

FIG. 7

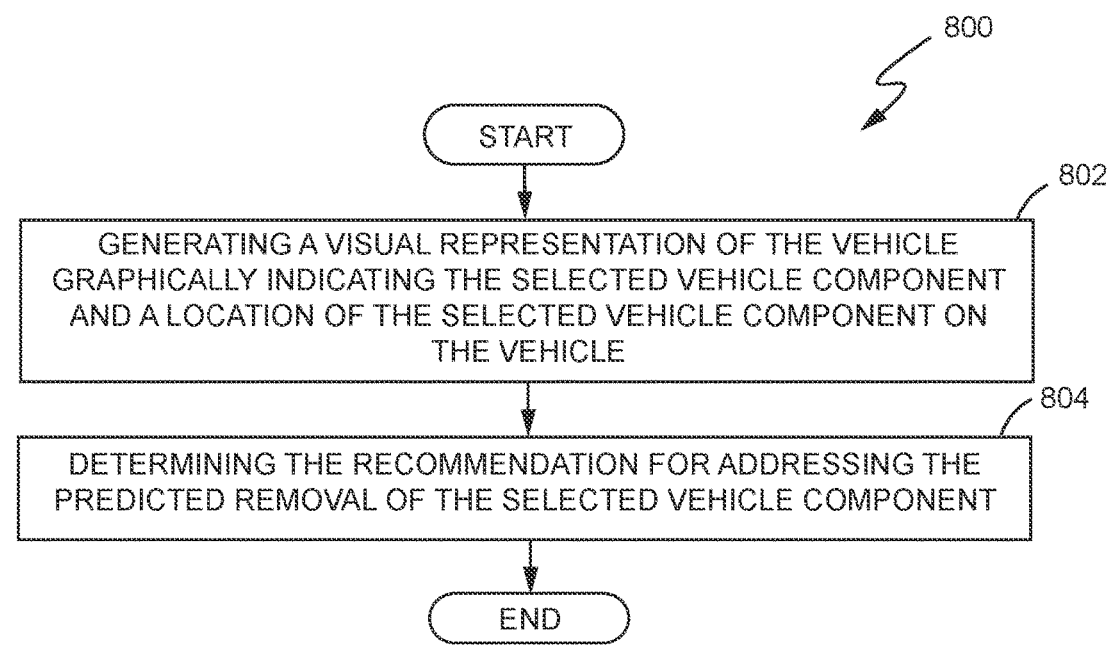

800

START

GENERATING A VISUAL REPRESENTATION OF THE VEHICLE
GRAPHICALLY INDICATING THE SELECTED VEHICLE COMPONENT
AND A LOCATION OF THE SELECTED VEHICLE COMPONENT ON
THE VEHICLE

802

DETERMINING THE RECOMMENDATION FOR ADDRESSING THE
PREDICTED REMOVAL OF THE SELECTED VEHICLE COMPONENT

804

END

FIG. 8

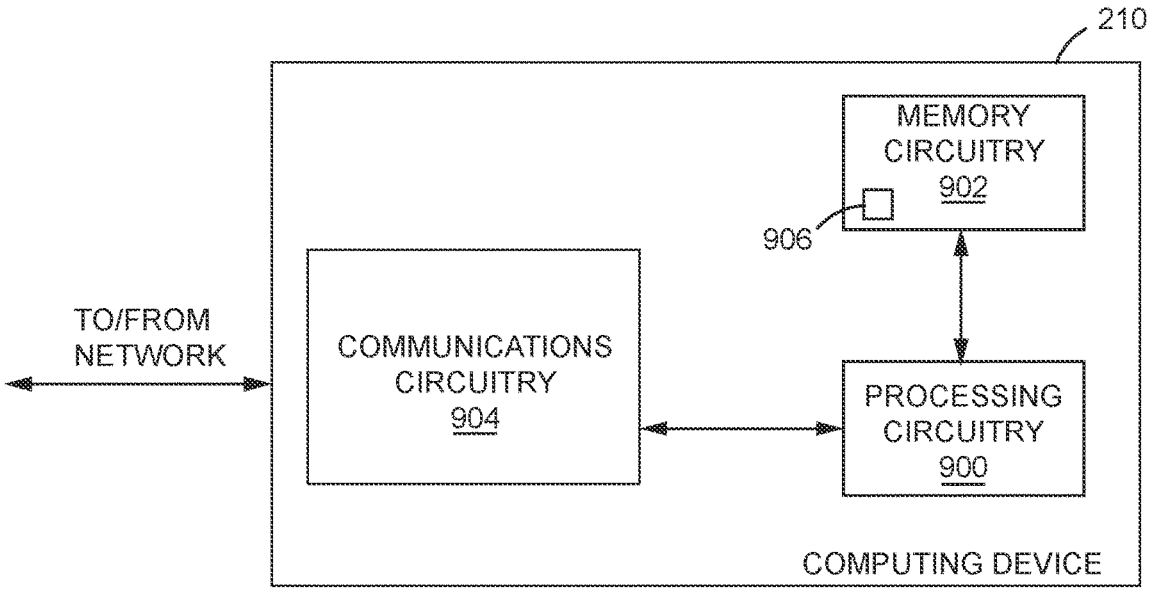

210

MEMORY
CIRCUITRY
902

906

TO/FROM
NETWORK

COMMUNICATIONS
CIRCUITRY
904

PROCESSING
CIRCUITRY
900

COMPUTING DEVICE

FIG. 9

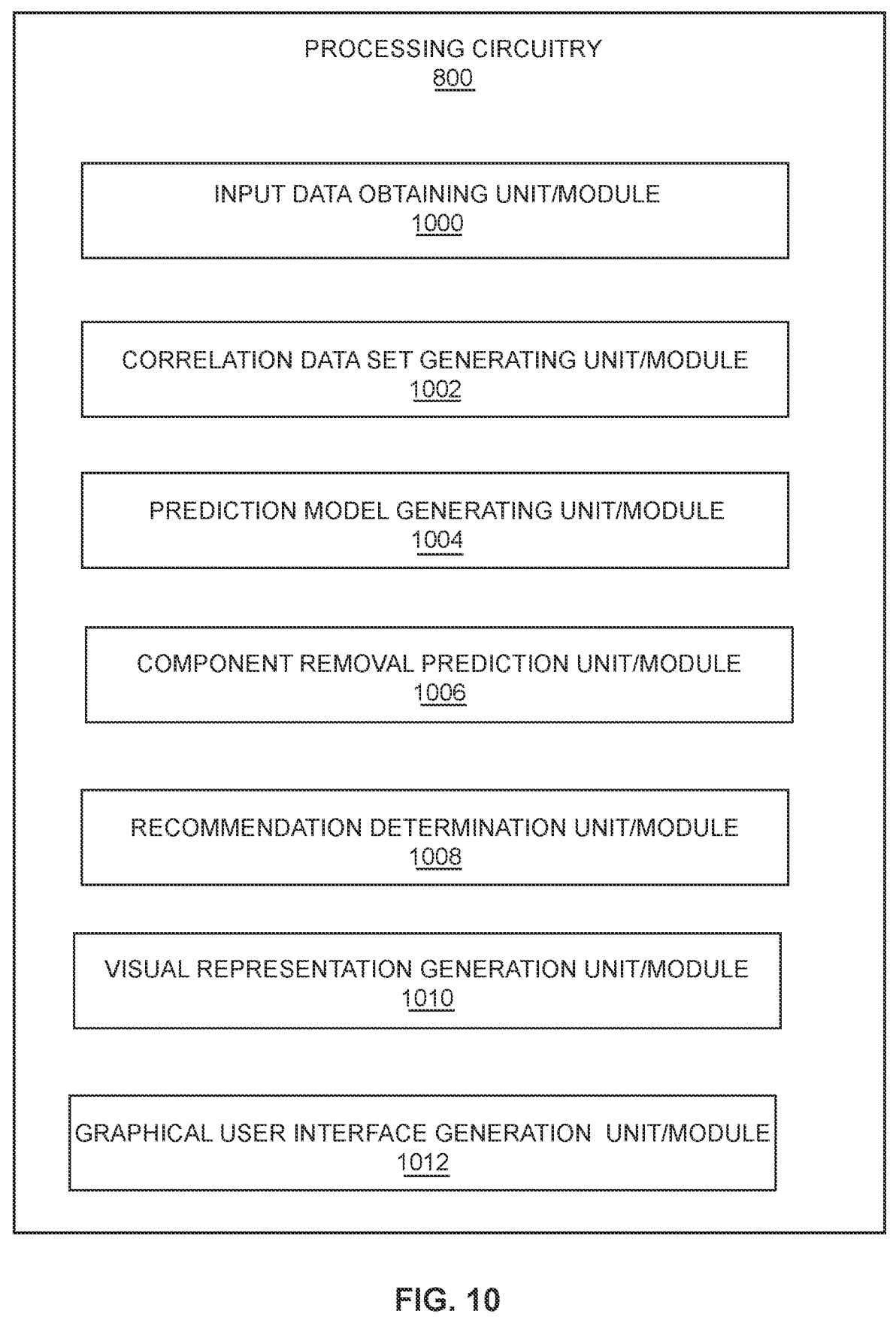

PROCESSING CIRCUITRY
800

INPUT DATA OBTAINING UNIT/MODULE
1000

CORRELATION DATA SET GENERATING UNIT/MODULE
1002

PREDICTION MODEL GENERATING UNIT/MODULE
1004

COMPONENT REMOVAL PREDICTION UNIT/MODULE
1006

RECOMMENDATION DETERMINATION UNIT/MODULE
1008

VISUAL REPRESENTATION GENERATION UNIT/MODULE
1010

GRAPHICAL USER INTERFACE GENERATION  UNIT/MODULE
1012

FIG. 10

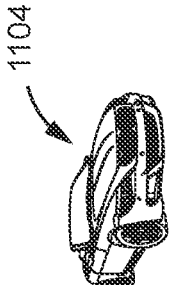
1104
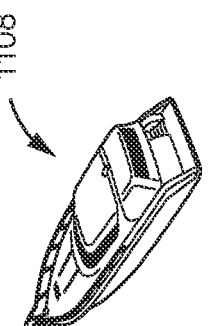
1108
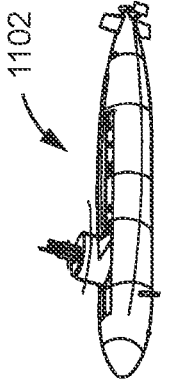
1102
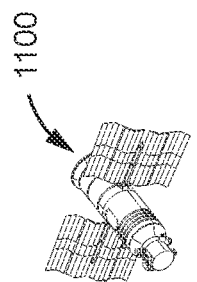
1100
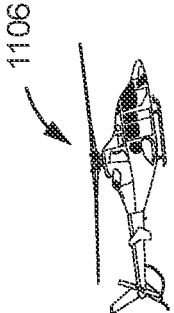
1106
FIG. 11

EFFICIENT FEATURE REDUCTION FOR COMPONENT FAULT PREDICTION

TECHNOLOGICAL FIELD

The present disclosure relates generally to the field of vehicle maintenance systems, and more specifically to computer-based tools for predicting whether a component currently installed on a vehicle should be removed or replaced.

BACKGROUND

Many vehicles are equipped with sensors that monitor the operational characteristics of the components currently installed on the vehicle. By way of example only, aircraft typically have sensors that measure the operational characteristics of various aircraft components, such as an Air Cycle Machine (ACM) and a Cabin Air Compressor (CAC). The sensors usually provide their output (e.g., signals and/or data representing the values of the measured operational characteristics) to various in-flight and ground-based systems so that the pilot and/or ground control members can monitor the health of the aircraft before, during, and after flight operations. Such sensors and systems greatly enhance the safety of the aircraft, as well as the proficiency with which the aircraft is handled.

The sensors on a vehicle generally interact with other sensors and/or vehicle components, as well as with a wide array of operational environments. Such interactions, therefore, can be very complex. As a result, the information and data produced by such interactions can be used to generate thousands of features that are relevant to the operation of a given component, as well as the monitored values for those features.

The significance of different features to the overall health of the vehicle may vary according to the operational phase of the vehicle. Such phases can include, but are not limited to, an overall operational phase of the vehicle, the states of control switches during a given operational phase, the positions of input/output valves during a given operational phase, and the current operational mode of the vehicle and/or vehicle component. These phases can be combined in various ways, thereby producing hundreds of thousands of phase-specific features and measurement values. The sheer number of features and their corresponding measured values greatly complicates any analysis and use of this information.

SUMMARY

Aspects of the present disclosure provide a phased approach to predicting whether a component currently installed on a vehicle should be removed from the vehicle. In a first phase, a prediction model is created using historical data and sample values that are associated with a vehicle component previously removed from the vehicle. In a second phase, a prediction is made as to whether the selected vehicle component currently installed on the vehicle should be removed. In these aspects, the selected vehicle component is the same as, or similar to, the vehicle component on which the creation of the prediction model is based. So predicted, aspects of the present disclosure generate a graphical user interface (GUI) for output to a user that visually indicates the selected vehicle component and provides a recommendation for addressing the predicted removal of the selected vehicle component.

Accordingly, in one aspect, the present disclosure provides a computing device for predicting whether a component on a vehicle should be removed. In this aspect, the computing device comprises processing circuitry and memory comprising instructions executable by the processing circuitry. The instructions, when executed by the processing circuitry, configure the computing device to perform different functions. Particularly, the computing device obtains input data for a first vehicle component previously removed from a vehicle. The input data associates a set of features of the first vehicle component to corresponding sample values. Additionally, the computing device generates, from the input data, a correlation data set comprising non-correlated features and correlated features, and that excludes features having sample values that are within a predetermined range of values. The computing device also generates a prediction model based on the non-correlated features in the correlation data set, their corresponding sample values, and operational data associated with the first vehicle component. Then, based on the generated prediction model, the computing device predicts whether a selected vehicle component should be removed. The computing device then generates a graphical user interface (GUI) visually indicating the selected vehicle component and provides a recommendation for addressing the predicted removal of the selected vehicle component. The computing device also outputs the GUI to a display for a user.

In one aspect, to generate the correlation data set, the set of features in the input data is partitioned into one or more non-overlapping input data partitions. Then, for each input data partition, one or more intra-partition feature pairs are determined. Each intra-partition feature pair comprises two features in the input data partition. One or more input data partition pairs are then generated based on a number of features in the input data partitions and merged into the correlation data set.

Additionally, for each input data partition pair, one or more cross-partition feature pairs are determined. Each cross-partition feature pair comprises a feature from a first input data partition of the cross-partition feature pair and a second feature from a second input data partition of the cross-partition feature pair. Further, the one or more cross-partition feature pairs are merged into the correlation data set.

In one aspect, to generate the correlation data set from the input data, the processing circuitry is configured to, for each feature in the input data, determine a mean and a standard deviation value for the feature based on the corresponding sample values and include the feature in the correlation data set based on a comparison of the standard deviation value to a predetermined standard deviation threshold value.

In some aspects, the feature is included in the feature in the correlation data set when the standard deviation value determined for the feature exceeds the predetermined standard deviation threshold value. Additionally, the feature is excluded from the correlation data set when the standard deviation value determined for the feature does not exceed the predetermined standard deviation threshold value.

In one aspect, the processing circuitry is further configured to generate, from the correlation data set, a correlated feature set comprising the correlated features, wherein each correlated feature in the correlated feature set is correlated with at least one other feature in the correlation data set, a non-correlated feature set comprising the non-correlated features, wherein each non-correlated feature in the non-correlated feature set is not correlated with any other feature in the correlation data set, and a correlation matrix comprising correlation coefficients associated with the non-correlated features in the non-correlated feature set.

To generate the correlated feature set, the non-correlated feature set, and the correlation matrix, the processing circuitry is configured to determine, for each pair of first and second features in the correlation data set, a correlation coefficient for the first and second features. The correlation coefficient indicates a relationship between the corresponding sample values of the first feature and the corresponding sample values of the second feature. If the correlation coefficient meets or exceeds a predetermined correlation threshold value, the second feature is included in the correlated feature set. If the correlation coefficient is less than the predetermined correlation threshold value, however, the second feature in the non-correlated feature set and the correlation coefficient associated with the first and second features is included in the correlation matrix.

To predict that the selected vehicle component should be removed, the processing circuitry in one aspect is further configured to select a non-correlated feature from the non-correlated feature set based on the correlation coefficient associated with the non-correlated feature and predict that the selected vehicle component should be removed based on the sample values for the selected non-correlated feature.

In one aspect, the processing circuitry is configured to generate a classification model based on the sample values associated with one or more of the non-correlated features and store the classification model in a memory.

In such aspects, the non-correlated features used in generating the classification model includes the selected non-correlated feature.

In one aspect, the processing circuitry is configured to predict that the selected vehicle component should be removed from the vehicle based on an output of the classification model.

To generate the GUI visually indicating the selected vehicle component, the processing circuitry is configured to, in one aspect, generate a visual representation of the vehicle graphically indicating the selected vehicle component and a location of the selected vehicle component on the vehicle and determine the recommendation for addressing the predicted removal of the selected vehicle component.

In at least one aspect, the selected vehicle component and the first vehicle component are of a same type of vehicle component.

In addition to the above aspects, the present disclosure also provides a method for predicting whether of a component on a vehicle should be removed. In this aspect, the method is implemented by a computing device and comprises obtaining input data for a first vehicle component previously removed from a vehicle. The input data associates a set of features of the first vehicle component to corresponding sample values. Further, the method comprises generating, from the input data, a correlation data set. In this aspect, the correlation data set is generated to comprise non-correlated features and correlated features, but exclude features having corresponding sample values that are within a predetermined range of values. The method further comprises generating a prediction model based on the non-correlated features in the correlation data set, their corresponding sample values, and operational data associated with the first vehicle component, and then predicting that a selected vehicle component should be replaced based on the prediction model. The method also comprises generating a graphical user interface (GUI) visually indicating the selected vehicle component and providing a recommendation for addressing the predicted removal of the selected vehicle component. In one aspect, the GUI is output to a display for a user.

In one aspect, generating the correlation data set comprises partitioning the set of features in the input data into one or more non-overlapping input data partitions. Then, for each input data partition, the method comprises determining one or more intra-partition feature pairs, generating one or more input data partition pairs based on a number of features in the input data partitions, and merging the one or more input data partition pairs into a first merged data set. In this aspect, each intra-partition feature pair comprises two features in the input data partition.

In at least one aspect, for each input data partition pair, the method further comprises determining one or more cross-partition feature pairs. Each cross-partition feature pair comprises a feature from a first input data partition of the cross-partition feature pair, and a second feature from a second input data partition of the cross-partition feature pair. So determined, the first merged data set and the one or more cross-partition feature pairs are then merged to generate the correlation data set.

In one aspect, generating the correlation data set from the input data comprises, for each feature in the input data, determining mean and standard deviation values for the feature based on the corresponding sample values and including the feature in the correlation data set based on a comparison of the standard deviation value to a predetermined standard deviation threshold value.

In some aspects, generating the correlation data set further comprises including the feature in the correlation data set when the standard deviation value determined for the feature exceeds the predetermined standard deviation threshold value, and excluding the feature from the correlation data set when the standard deviation value determined for the feature does not exceed the predetermined standard deviation threshold value.

In some aspects, the method further comprises generating, from the correlation data set, a correlated feature set comprising the correlated features, a non-correlated feature set comprising the non-correlated features, and a correlation matrix. Each correlated feature in the correlated feature set is correlated with at least one other feature in the correlation data set. However, each non-correlated feature in the non-correlated feature set is not correlated with any other feature in the correlation data set. The correlation matrix comprises correlation coefficients associated with the non-correlated features in the non-correlated feature set.

In one aspect, generating the correlated feature set, the non-correlated feature set, and the correlation matrix, comprises, for each pair of first and second features in the correlation data set, determining a correlation coefficient for the first and second features. The correlation coefficient indicates a relationship between the sample values of the first feature and the sample values of the second feature. If the correlation coefficient meets or exceeds a predetermined correlation threshold value, the method comprises including the second feature in the correlated feature set. However, if the correlation coefficient is less than the predetermined correlation threshold value, the method comprises including the second feature in the non-correlated feature set and including the correlation coefficient into the correlation matrix.

In one aspect, predicting that the selected vehicle component should be removed comprises selecting a non-correlated feature from the non-correlated feature set based on the correlation coefficient associated with the non-correlated feature and predicting that the selected vehicle component should be removed based on the sample values for the selected non-correlated feature.

In one aspect, the method further comprises generating a classification model based on the sample values associated with one or more of the non-correlated features, and storing the classification model in a memory.

In some aspects, the non-correlated features used to generate the prediction model includes the selected non-correlated feature.

In at least one aspect, predicting that the selected vehicle component should be removed is based on an output of the classification model.

In one aspect, generating a graphical user interface (GUI) visually indicating the selected vehicle component comprises generating a visual representation of the vehicle graphically indicating the selected vehicle component and a location of the selected vehicle component on the vehicle and determining the recommendation for addressing the predicted removal of the selected vehicle component.

In addition to the aspects above, the present disclosure also provides a non-transitory computer readable medium. The computer readable medium comprises instructions stored thereon that, when executed by processing circuitry of a computing device, configures the computing device to obtain input data for a first vehicle component previously removed from a vehicle, the input data associating a set of features of the first vehicle component to corresponding sample values, generate, from the input data, a correlation data set comprising non-correlated features and correlated features, and that excludes features having sample values that are within a predetermined range of values, generate a prediction model based on the non-correlated features in the correlation data set, their corresponding sample values, and operational data associated with the first vehicle component, predict that a selected vehicle component currently installed on the vehicle should be removed based on the prediction model, generate a graphical user interface (GUI) visually indicating the selected vehicle component and providing a recommendation for addressing the predicted removal of the selected vehicle component, and output the GUI to a display for a user.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
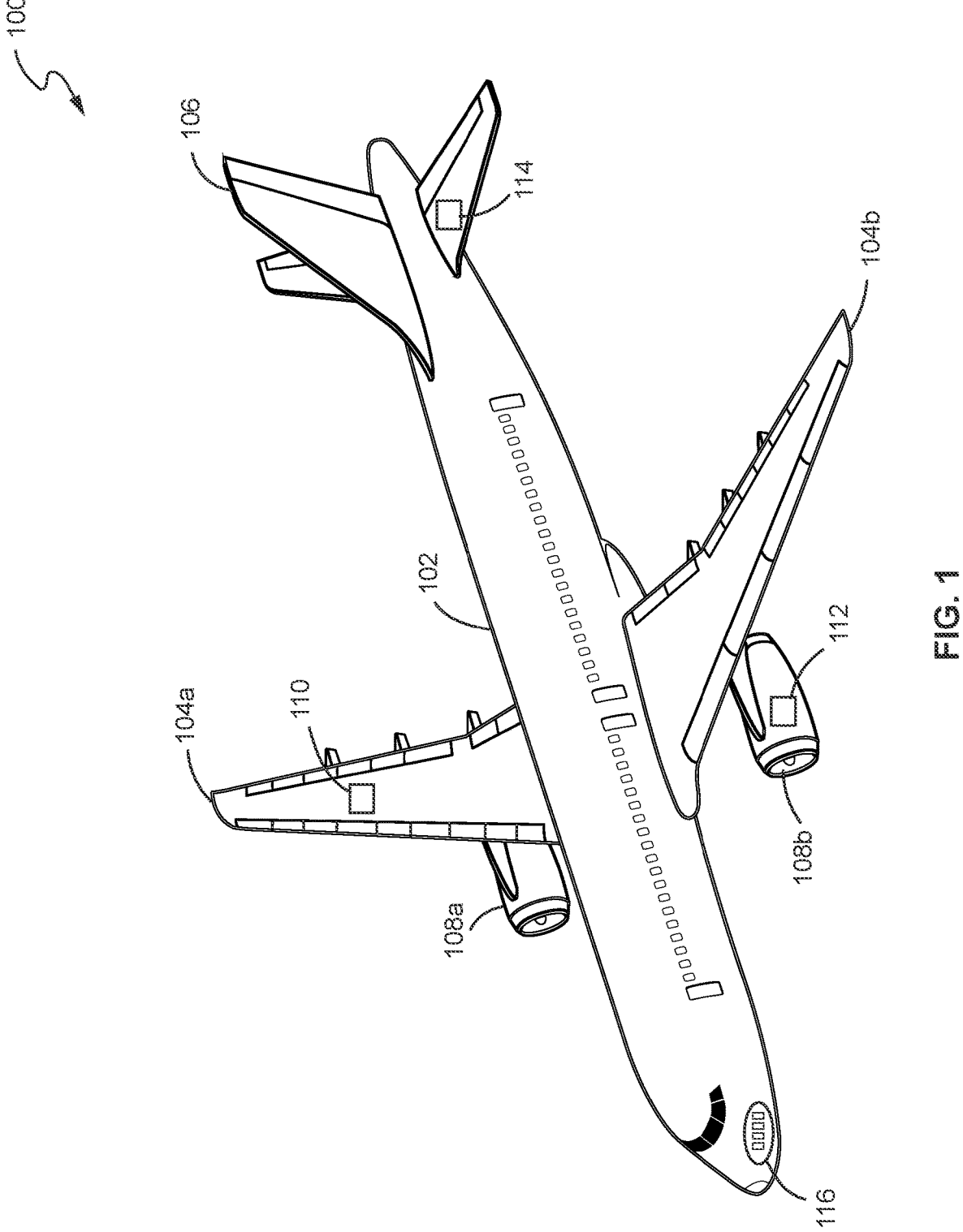

Having thus described variations of the disclosure in general terms, reference will now be made to the accompanying drawings, which are not necessarily drawn to scale, and wherein:

FIG. 1 is a perspective view illustrating an example vehicle configured according to aspects of the present disclosure.

Figure 2:
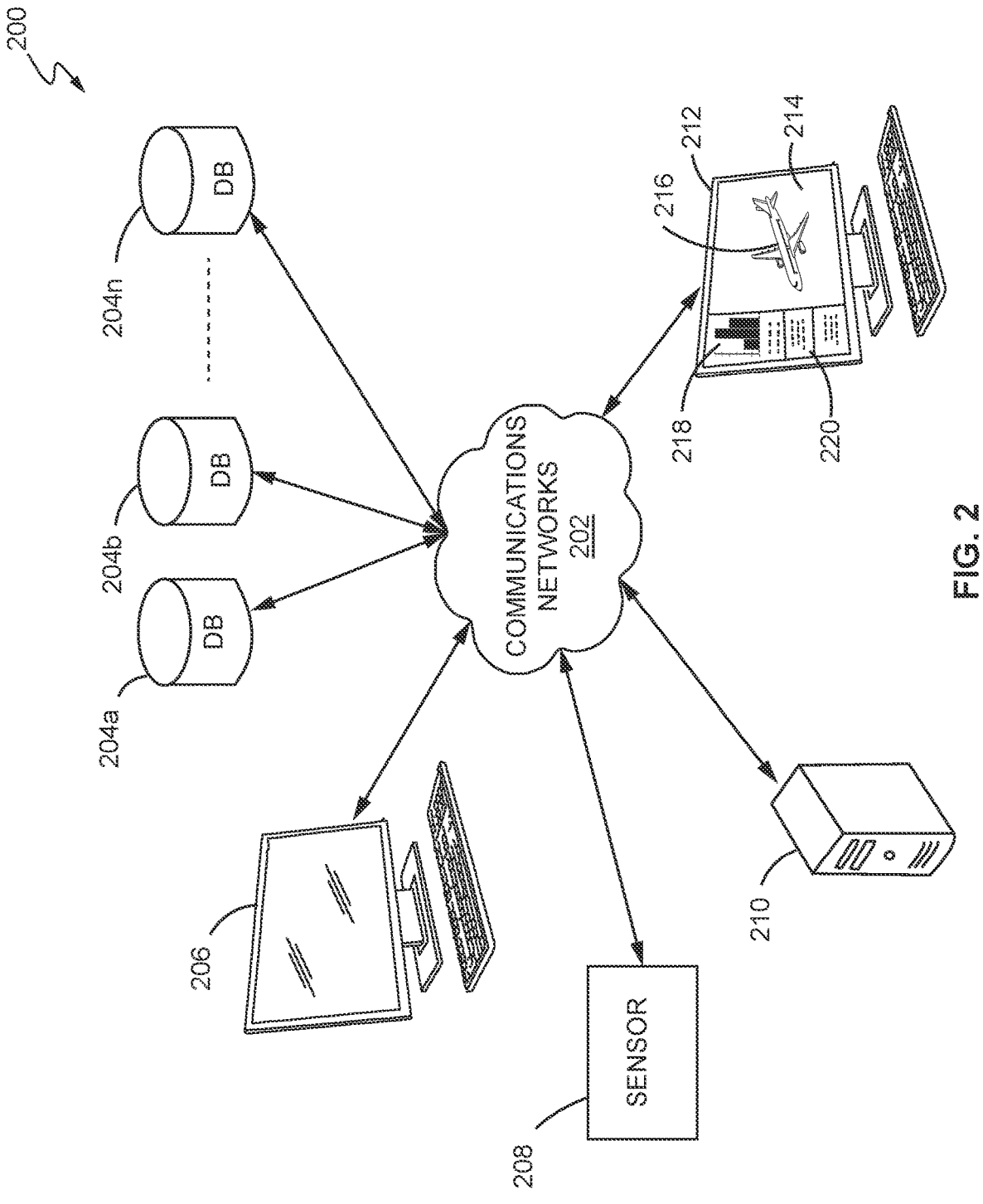

FIG. 2 illustrates a computer network configured for predicting whether a component should be removed from a vehicle according to one aspect of the present disclosure.

FIGS. 3A-3D illustrate how data is created from tabular input data, and then used to predict that a component should be removed from a vehicle according to one aspect of the present disclosure.

FIG. 4 is a flow diagram illustrating a method for predicting that a vehicle component currently installed on a vehicle should be removed from the vehicle according to one aspect of the present disclosure.

Figure 5:
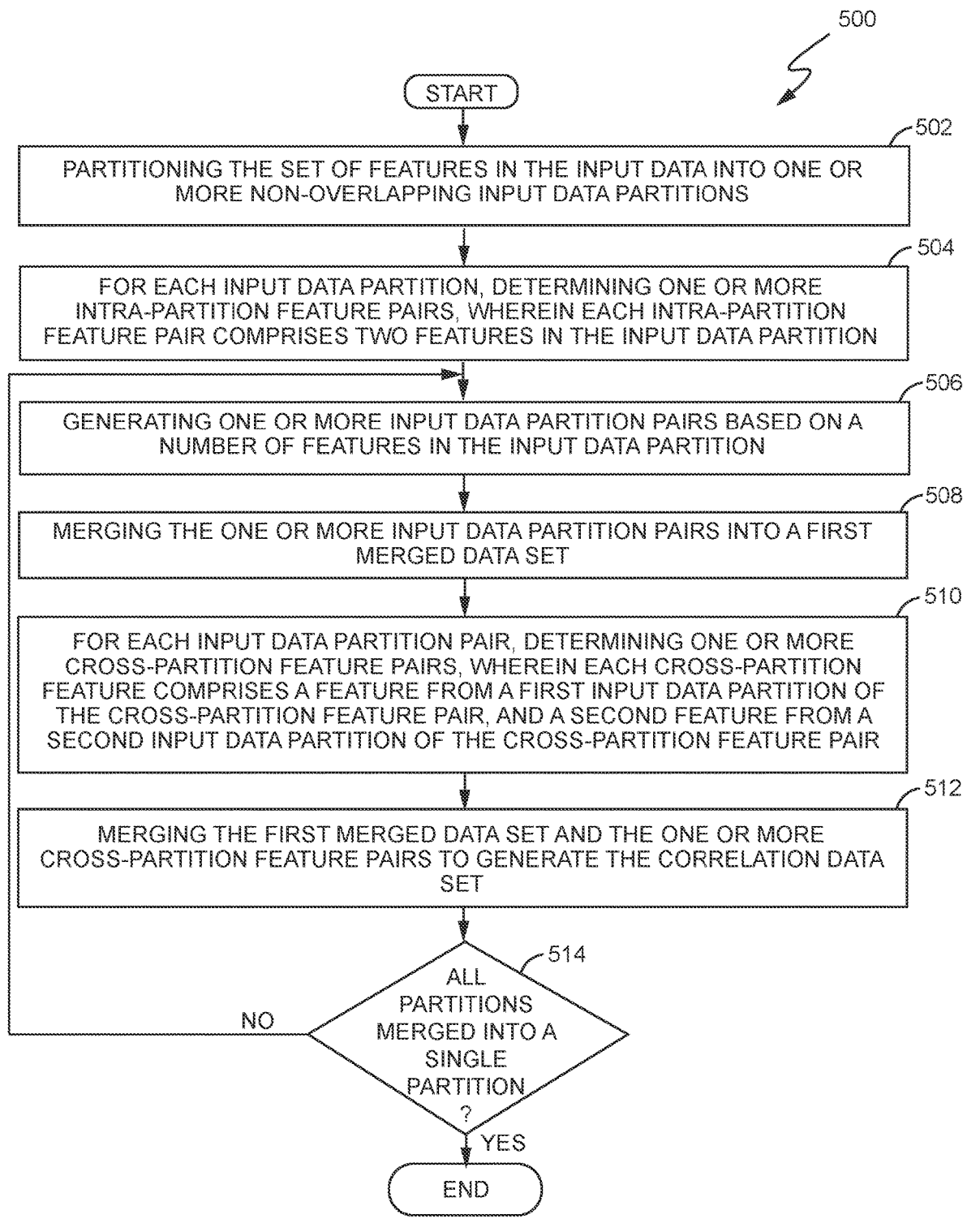

FIG. 5 is a flow diagram illustrating a method for predicting that a vehicle component currently installed on a vehicle should be removed from the vehicle according to an aspect of the present disclosure.

Figure 6A:
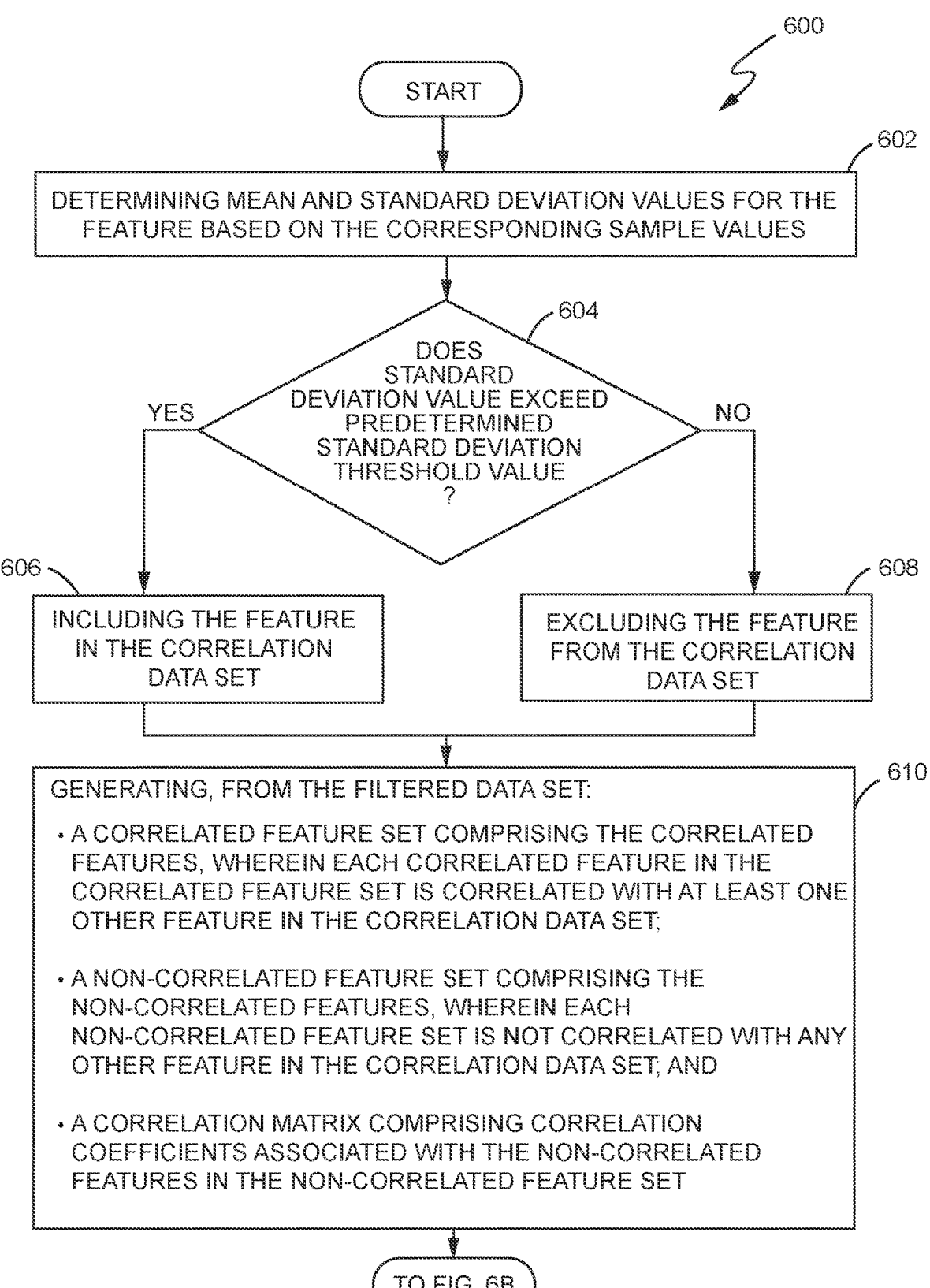

FIGS. 6A-6C are flow diagrams illustrating a method for generating the data used in predicting that a vehicle component currently installed on a vehicle should be removed from the vehicle according to one aspect of the present disclosure.

FIG. 7 is a flow diagram illustrating a method for generating a classification model according to one aspect of the present disclosure.

FIG. 8 is a flow diagram illustrating a method for generating a graphical user interface (GUI) for display to a user according to one aspect of the present disclosure.

FIG. 9 is a schematic block diagram illustrating a computer device configured to predict that a vehicle component currently installed on a vehicle should be removed from the vehicle according to one aspect of the present disclosure.

FIG. 10 a functional block diagram illustrating a computer program product for predicting that a vehicle component removal according to one aspect of the present disclosure.

FIG. 11 illustrates some additional example vehicles that may be configured for predicting that a component currently installed on a vehicle should be removed from the vehicle according to aspects of the present disclosure.

DETAILED DESCRIPTION

Aspects of the present disclosure provide a phased approach to predicting whether a component currently installed on a vehicle should be removed or replaced. In a first phase, aspects of the present disclosure create a prediction model using historical data and sample values that are associated with a vehicle component previously removed from the vehicle. In a second phase, aspects of the present disclosure predict whether a selected vehicle component currently installed on the vehicle should be removed from the vehicle. In these aspects, the selected vehicle component is the same as, or similar to, the vehicle component on which the creation of the prediction model is based. So predicted, aspects of the present disclosure generate a graphical user interface (GUI) for output to a user that visually indicates the selected vehicle component and provides a recommendation for addressing the predicted removal of the selected vehicle component.

Turning now to the drawings, FIG. 1 illustrates a vehicle 100 configured according to an aspect of the present disclosure. In the illustrated example, vehicle 100 is an aircraft. However, those of ordinary skill in the art will appreciate that this is for illustrative purposes only. As seen in more detail later, vehicle 100 is not limited to being an aircraft, but rather, may be other types of vehicles including, but not limited to, ships, cars, spacecraft, and the like. Thus, predicting whether a component currently installed on a vehicle 100 that is not an aircraft should be removed according to the aspects disclosed herein is also possible.

As seen in FIG. 1, vehicle 100 is an aircraft and includes a fuselage 102, wings 104a, 104b (collectively herein "wings 104"), a tail section 106, and a plurality of engines 108a, 108b (collectively herein "engines 108"). Additionally, vehicle 100 also comprises a variety of vehicle components. Such components may be installed or positioned anywhere on vehicle 100 and include, but are not limited to, one or more wing-based components 110 (e.g., a flight control member or fuel measurement device), engine-based components 112 (e.g., a low or high pressure compressor), tail-based components 114 (e.g., an Air Cycle Air Conditioning (ACAC) system or a valve for an ACAC system), and one or more components or groups of components (e.g., control panels, flight control members) 116 located in or near the cockpit or nose of vehicle 100. Other components and/or and groups of components may be located internally or externally of the cabin area of fuselage 102 and include, for example, the components of a Cabin Air Compressor (CAC).

Vehicle 100 also comprises a variety of sensors and other devices and systems configured to monitor the vehicle components before, during, and after flight operations. The sensors and monitoring devices measure the operation of respective vehicle components or groups of vehicle components, and send values and/or signals representing those measurements to various computing systems for storage and/or analysis. One such system is illustrated in FIG. 2 as system 200.

As seen in FIG. 2, system 200 comprises one or more public and/or private communications networks 202 communicatively interconnecting one or more databases (DBs) 204a, 204b, . . . , 204n (collectively herein, "DB 204"), a user input terminal 206, one or more sensors 208 on vehicle 100, a network-based computing device (e.g., a server device) 210, and a user output terminal 212. It is possible that system 200 comprises other network devices and components. However, those of ordinary skill in the art will readily appreciate that such other devices and/or components are omitted from FIG. 2 simply for ease of discussion.

In one aspect, the one or more communications networks 202 are configured to carry data packets, and as such, may comprise any type of public and/or private data network known in the art. Such networks include, without limitation, IP networks such as the Internet, one or more ETHERNET networks, any of the various existing satellite networks and/or wireless networks, and any combination thereof. In some aspects, the one or more communications networks 202 may comprise one or more busses that allow microcontrollers and other devices on board vehicle 100, such as sensors 208, for example, to communicate avionics data with each other, and eventually, with one or more of the entities connected to communications networks 202. Such busses may include, for example and without limitation, a Controller Area Network (CAN bus) and an Aeronautical Radio INC (ARINC) 429 bus. According to aspects of the present disclosure, communications networks 202 facilitates the storage of data received from the sensors 208 and/or user input terminal 206 into one or more of the appropriate DBs 204. For example, DB 204a may be configured to store historical data associated with vehicle components that have already been removed from vehicle 100. Similarly, DB 204b may be configured to store operational data that is associated with the operation of, and faults experienced by, the vehicle components previously removed from vehicle 100. Whatever the data, though, communications networks 202 facilitates the communication of that data between the various devices connected to it.

In one aspect, user input terminal 206 and sensors 208 provide the data and signals stored in one or more of the DBs 204 and, as described in more detail later, for analysis by computing device 210. For example, sensors 208 monitor the operation of one or more vehicle components and send measurement values associated with the operation of those components to DBs 204 for storage. For example, consider sensors 208 tasked with monitoring the ACAC system of an aircraft. In these aspects, sensors 208 may measure and send one or more values representing the detected temperature and humidity of the interior of the cabin, as well as the operational mode the ACAC system is operating in at the time the measurements are taken. Similarly, other sensors 208 on the aircraft may measure and send values representing a velocity and the altitude of the aircraft at the time the temperature and humidity readings are taken. Alternatively, or in addition to sensors 208, users such as maintenance and/or operational personnel, for example, may manually provide data values for these and other features of the aircraft via user input terminal 206. Regardless of how the data is provided, however, values that are measured by sensors 208 and/or input by a user via user input terminal 206 may be communicated to communications networks 202 and stored in one or more of the DBs 204 for subsequent processing and analysis.

Computing device 210, which as stated above may be a computer server, comprises a network-based computing device that is configured to predict whether a given vehicle component currently installed on vehicle 100 should be removed. If computing device 210 predicts such a removal, computing device 210 is configured to generate a graphical user interface (GUI) 214 for output to a user. As described in more detail later, computing device 210 generates GUI 214 to visually represent vehicle 100, a selected vehicle component 216 that is predicted to be removed, and a location of the selected vehicle component 216 on vehicle 100. Additionally, in at least one aspect, GUI 214 is generated to include graphical indicators 218 such as one or more graphs, diagrams, and/or other information helpful for visualizing the fault(s) experienced by the component, as well as the predicted removal of the component, for the user. In one aspect, GUI 214 is generated to provide a recommendation 220 for addressing the predicted component removal. For example, in one aspect, the recommendation 220 comprises a link to a particular section of a maintenance manual describing the process for safely removing/replacing that selected vehicle component 216.

Generally, the components of vehicle 100 require periodic maintenance, which typically leads to the repair or removal of the components. To facilitate safety, various agencies, such as federal agencies and commercial carriers, for example, conduct regular inspections of the vehicle 100 and its components. As part of these inspections, the data records related to the vehicle components stored in DBs 204 may be analyzed. However, not only is such an analysis difficult, but the amount of data considered in an inspection makes conventional processes unmanageable and cumbersome.

Particularly, the vehicle components that are monitored by sensors 208 often interact with other components and environments. For example, some sensors 208 configured to monitor a given vehicle component may be external to vehicle 100 and detect features such as temperature and humidity, while other sensors 208 associated with the given vehicle component may be located internal to the vehicle 100 and detect features such as the velocity and altitude of the aircraft. Regardless of the particular sensor 208 location, though, each of these sensor measurements (i.e., sample values) may need to be considered when inspecting a given vehicle component or when determining whether the given component should be removed or replaced.

There are, of course, hundreds of different features that may be monitored. And when one considers the complexity of the interactions between the vehicle components and their corresponding environments, the number of features that may be of interest for any given vehicle component can easily reach into the hundreds of thousands. Further, the various features of the vehicle components can be combined in any number of different ways, and moreover, may be dependent on different states of operation and/or phases of flight. These additional parameters, however, only serve to greatly increase the complexity of collecting and analyzing the data.

Attempts have been made to limit the amount of data presented for analysis. For example, given a set of features for a given vehicle component, some conventional processes will first apply a statistical technique such as Pearson correlation to remove redundant features from the given set of features. Once the redundant features are removed, other more complicated feature reduction techniques are applied to the remaining features to determine which features are correlated to each other. Then, based on the correlated features, the conventional processes may determine information about the vehicle component.

However, conventional processes must perform correlation calculations for each pair of features, and such calculations require quadratic computation time. Therefore, the amount of time and resources needed by conventional processes for determining which features are correlated with each other increases as the number of features under consideration increase. To help mitigate this, conventional processes may limit the number of features under consideration, and instead focus on a larger number of sample values (e.g., measurements) for each feature. Still, though, these conventional processes are not usable when the number of features for consideration exceeds a few thousand.

Accordingly, aspects of the present disclosure provide a tool that determines the non-correlated features of a given set of features associated with a vehicle component, and then uses the information related to the non-correlated features to predict whether that vehicle component should be removed/replaced. More specifically, a computing device configured according to the present aspects calculates the correlations between pairs of features in parallel and filters out undesirable features early during processing. Not only does this enable the computing device to leverage the multi-CPU/multi-core hardware typically found in many powerful computing devices (e.g., blade servers), but it also eliminates redundant features. This greatly reduces the load on the resources needed for processing the features and their corresponding sample values, and shortens the amount of time required for the processing.

FIGS. 3A-3D are flow diagrams illustrating a method by which an aspect of the present disclosure identifies the non-correlated features to use for predicting whether a given vehicle component should be removed from vehicle 100.

Figure 3A:
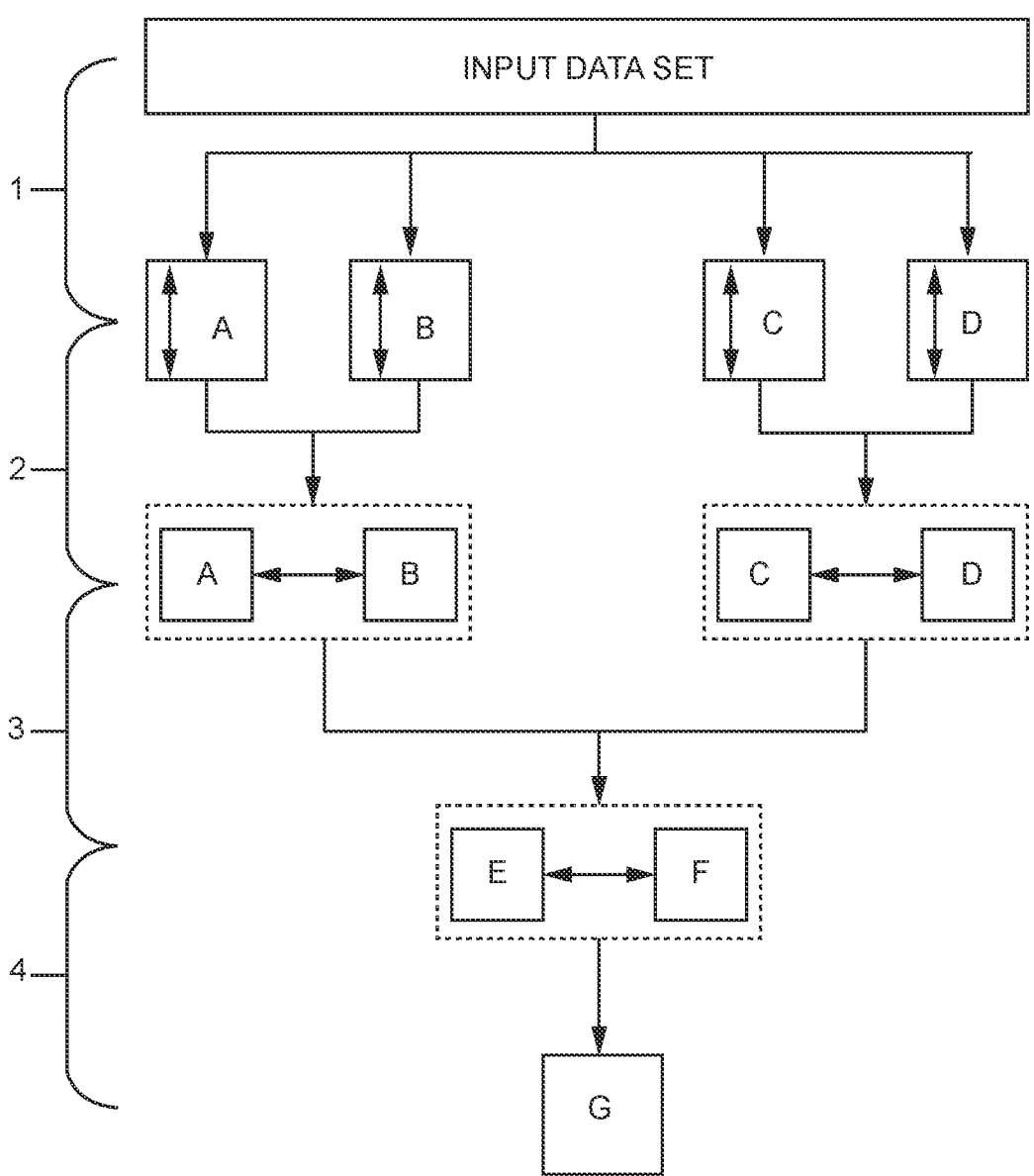

FIG. 3A provides a high-level explanation of one aspect of the present disclosure. As described in more detail below, in a first stage of this aspect of the present disclosure, an input data set is partitioned into a plurality of partitions. In this example, the input data set is partitioned into 4 partitions—A, B, C, and D. Once partitioned, aspects of the present disclosure remove the features associated with zero standard deviation from those partitions. Then, the present aspects calculate the correlations in each partition and generate a correlation data set for the "intra-partition" feature pairs (shown by the vertical double arrows in each partition A-D). In this example, this leaves two pairs of partitions—a first partition pair comprising partitions A and B and a second partition pair comprising partitions C and D.

In a second stage, the present aspects generate a correlation data set for the "cross-partition" feature pairs (shown by the horizontal double arrows between first and second partitions A and B, and C and D, respectively) from each partition pair. As will be described in more detail later, aspects of the present disclosure use only the non-correlated features from each partition A-D.

In a third stage, the present aspects merges partition pair A and B into partition E, and also merges partition pair C and D into partition F. After merging, the present aspects have generated a correlation data set for each intra-partition feature pair within either partition E or partition F. However, there are no cross-partition feature pairs from E and F (i.e., cross-correlation of the features from A and C, A and D, B and C, and B and D). Therefore, in a fourth stage, the present aspects generate a correlation data set for the cross-partition feature pairs in partition pair E and F, and merges partition pairs E and F into a final single partition G. The final, single partition G comprises the correlation data set for each intra-partition feature pair within G, where G comprises the entire set of correlated and non-correlated features. As a result, the present aspects provide a correlation data set for all feature pairs (with the exception of the features that were previously filtered).

Figure 3B:
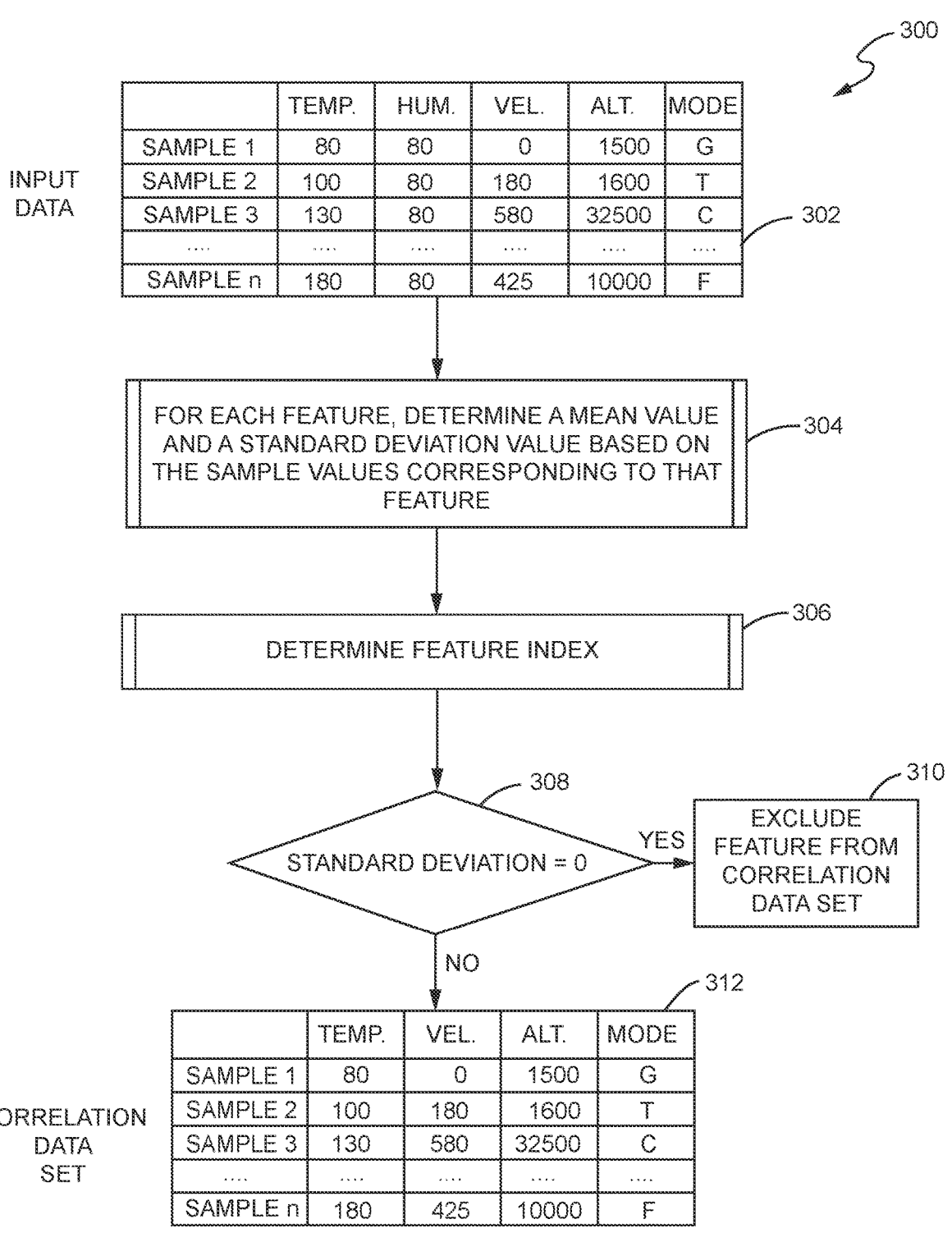
Figure 3C:
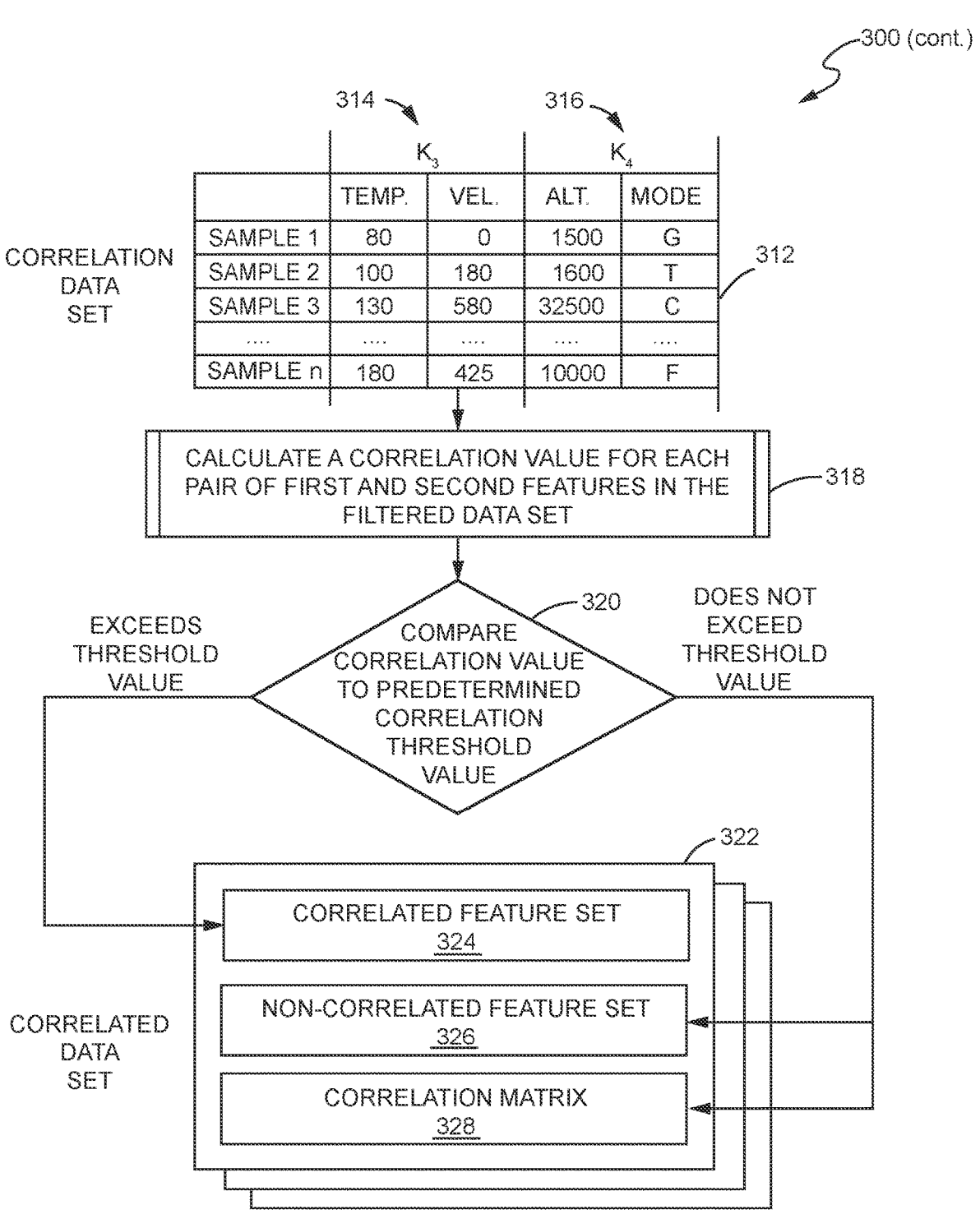
Figure 3D:
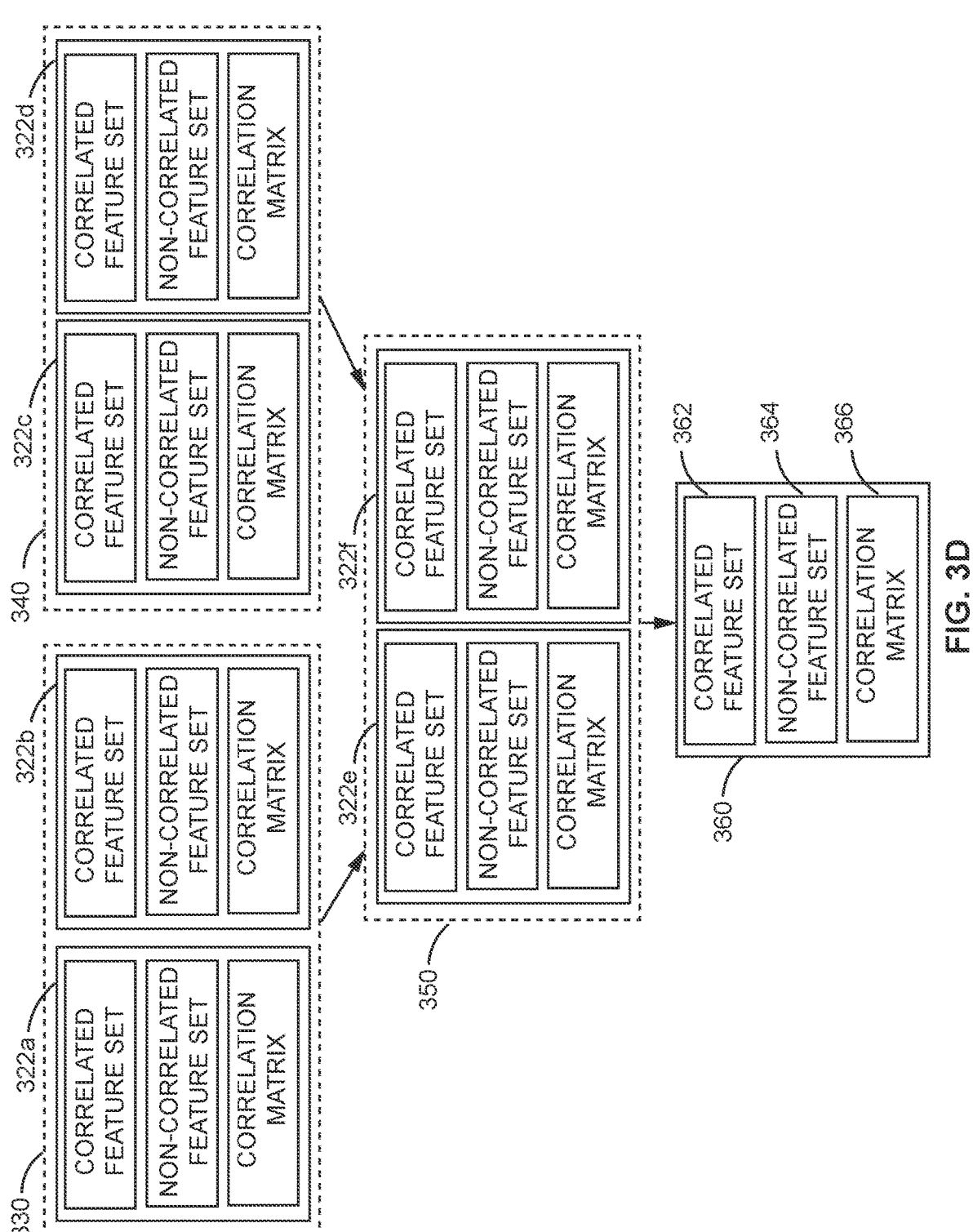

FIGS. 3B-3D illustrate these aspects in more detail. As seen in FIG. 3B, this aspect of the present disclosure provides a method 300 that begins with obtaining a set of input data 302. By way of example only, input data 302 may be retrieved from one or more of the DBs 204, and/or received from the user input terminal 206 and/or sensors 208. Regardless of how the data is obtained, however, one aspect of the present disclosure receives or formats input data 302 as a table where each column is a "feature" (e.g., TEMP, HUM, VEL, ALT, MODE, etc.) and each row is a sample value that corresponds to that feature.

In this example, processing of the tabular input data 302 is performed using a multi-threaded approach. For example, let N be the total number of features (i.e., columns) in input data 302. A computing device, such as computing device 210, for example, partitions the tabular input data 302 into a plurality of features evenly across K computation threads. For each feature in its assigned partition, a thread $K_n$ computes a mean and a standard deviation value based on the sample values that correspond to that feature (box 304). For example, a first thread $K_1$ may be assigned the "TEMP" and "HUM" features. Respective mean and standard deviation values are then computed for each of the "TEMP" and "HUM" features based on their respective corresponding sample values. Similarly, a thread $K_2$ may be assigned the "VEL" and "ALT" features. Based on the corresponding sample values for those features, respective mean and standard deviation values are computed for each of the "VEL" and "ALT" features. In this aspect, the "MODE" feature is not considered as it has a non-numeric sample value.

Although the threads $K_1$, $K_2$ may begin processing the sample values of their assigned features in any order, it is possible that they finish in a different order. Therefore, one aspect of the present disclosure determines a feature index (i.e., column index) for each feature (box 306). The feature index is an integer that indicates the position of the column in the input data 302, and is used to organize the computed mean and standard deviation values for all the features in a predetermined order. The mean and standard deviation values may be computed using any known computational method.

The computed standard deviation values for each feature are then compared to a standard deviation threshold value, which in this aspect, is '0' (box 308). The comparison will identify which of the features will be useful in predicting whether a given vehicle component should be removed. For example, in this aspect, features having a non-zero standard deviation value are useful for such predictions, whereas features having a standard deviation value of zero are not. Therefore, according to the present aspects, a given feature is included in a correlation data set 312 if the computed standard deviation value for the given feature exceeds the standard deviation threshold value. If the computed standard deviation value for the given feature is zero, however, the given feature is excluded from the correlation data set 312 (box 310).

For example, as seen in FIG. 3B, the sample values corresponding to the features "TEMP" (TEMPERATURE), "VEL" (VELOCITY), and "ALT" (ALTITUDE) are all different and vary widely. This indicates that these features would have a standard deviation of greater than zero, and therefore, would be included in the correlation data set 312. However, the sample values corresponding to the feature "HUM" (i.e., HUMIDITY) in input data 302 are all "80." This indicates that the standard deviation value for the sample values associated with the HUM feature is equal to zero. As such, the "HUM" feature is removed from further consideration and processing by being excluded from the correlation data set 312.

It should be noted here that FIG. 3B illustrates correlation data set 312 as comprising the features and their corresponding sample values. However, those of ordinary skill in the art will appreciate that the present aspects are not so limited. In one aspect, for example, only the feature names (or other feature identifiers) of features having a non-zero standard deviation value are included into the correlation data set 312. Not only does eliminating such features reduce the load placed on precious memory resources, but it also decreases the time needed for processing.

At this point, the correlation data set 312 comprises only those features that are useful for predicting whether the vehicle component currently installed on vehicle 100 should be removed. However, the number of features is still very large and unmanageable. Therefore, method 300 will process the correlation data set 312 to further identify the particular feature or set of features that will be used in the prediction.

With the removal of the HUM feature, the number of features is different than when method 300 started. Therefore, as seen in FIG. 3C, method 300 resets N to be the number of features (i.e., columns) in the correlation data set 312. Method 300 then partitions the N features evenly over a plurality of threads K, resulting, in this aspect, in partitions 314, 316. For example, as seen in FIG. 3C, the TEMP and VEL features are in a first partition 314 assigned to thread $K_3$. The ALT and MODE features are in a second partition 316 and assigned to a different thread $K_4$. Although only two threads are shown here, those of ordinary skill in the art will appreciate that this is for illustrative purposes and that the correlation data set 312 may be partitioned into any number of partitions—each of which will have its own thread $K_n$.

Once partitioned, each thread $K_n$ determines whether pairs of features in its partition are correlated. In the present aspects, each pair of features comprises a first feature (e.g., TEMP in partition 314) and a second feature (e.g., VEL in partition 314). In accordance with the present aspects, these two features are deemed to be "correlated" if a change in the sample values of the first feature affects or depends on a change in the sample values of the second feature. On the other hand, these features are deemed to be "non-correlated" if the change in the sample values of the first feature does not affect or depend on the change in the sample values of the second feature.

To determine whether two features are correlated or non-correlated, thread $K_n$ first calculates a correlation coefficient for each pair of first and second features in its assigned partition of the correlation data set (box 318). Any algorithm known in the art may be utilized for calculating the correlation coefficient. However, in this aspect, the following calculation is utilized to determine whether two features in a given partition are/are not "correlated features."

For each pair of first and second features in a given partition:

$$CV = \frac{(\text{mean } (x * y) - (\text{mean } (x) * (\text{mean } (y))))}{stddev(x)stddev(y)}$$

where:
CV is the computed correlation coefficient;
x is the first feature of a feature pair; and
y is the second feature of the feature pair.

Once the CV is calculated for each pair of first and second features in the partition, thread $K_n$ compares the computed CV to a predetermined correlation coefficient threshold (CVT) (box 320). If the value of CV exceeds the value of CVF (i.e., CV>CVF), the two features are deemed to be correlated. If the value of CV does not exceed the value of CVF (i.e., CV≤CVF), the two features are deemed to be non-correlated. Regardless of whether any two given features are correlated or non-correlated, however, the features are added to a correlated data set 322 for further processing.

As seen in FIG. 3C, the correlated data set 322 comprises a correlated feature set 324, a non-correlated feature set 326, and a correlation matrix 328 for each partition 314, 316. In this aspect, only the feature name or other feature identifier is stored in the correlated and non-correlated feature sets 324, 326. In other aspects, although it is not required, the corresponding sample values for the correlated and/or the non-correlated features are also added to the correlated and non-correlated feature sets 324, 326. Regardless, based on the results of the comparison (box 320), if the first and second features are deemed to be correlated features, the second feature is added to the correlated feature set 324. This removes the second feature from future correlation calculations. If the first and second features are deemed to be non-correlated, however, the first and second features are added to the non-correlated feature set 326. Additionally, for non-correlated features, the computed CV for the first and second features is added to the correlation matrix 328. The union of the correlated feature set 324 and the non-correlated feature set 326 is the set of all features in the correlation data set 312.

Each thread $K_n$ can be assigned a single partition of two features, or be assigned multiple partitions of two features each. Regardless, each thread $K_n$ iteratively processes its assigned partition(s) and determines a correlated data set 322 for that partition. Further, each of the correlated data sets 322 comprises a correlated feature set 324, a non-correlated feature set 326, and a correlation matrix 328. Then, once all threads K, are finished processing, method 300 merges the correlated data sets 322 of each partition into a single correlated data set. Thereafter, a prediction model is created based on the non-correlated feature set of the merged correlated data set and the prediction is based on the non-correlated features in that non-correlated feature set.

FIG. 3D illustrates an example of this process according to one aspect of the present disclosure. As seen in FIG. 3D, processing of a first partition by a first thread results in a first data group 330 comprising first and second correlated data sets 322a, 322b. Each of these first and second correlated data sets 322a, 322b has its own correlated feature set, non-correlated feature set, and correlation matrix. Similarly, processing of a second partition by a second thread results in a second data group 340 comprising first and second correlated data sets 322c, 322d. Each of these first and second correlated data sets 322c, 322d also has its own correlated feature set, non-correlated feature set, and correlation matrix. These groups 330, 340 are then merged into a third data group 350 comprising first and second correlated data sets 322e, 322f, and finally, into a single correlated data set 360 comprising a correlated feature set 362, a non-correlated feature set 364, and a correlation matrix 366.

In more detail, one aspect of the present disclosure first determines the number of correlated data sets 322 produced by method 300 (as seen in FIG. 3C). While the number of correlated data sets 322 is greater than 1, method 300 sorts each correlated data set 322 in ascending order of the number of non-correlated features in the non-correlated feature set 326. The sorted correlated data sets 322 are then split evenly and each is assigned a thread K to merge the correlated data sets 322 into respective merged groups 330, 340. As seen in FIG. 3D, for example, merged group 330 comprises sorted correlated data sets 322a and 322b, and merged group 340 comprises sorted correlated data sets 322c and 322d.

In this aspect, merging the correlated data sets 322a, 322b, 322c, 322d of merged groups 330, 340 into merged group 350 is based on the CV of the non-correlated features in the non-correlated feature sets. Particularly, as previously described, method 300 computes the correlation coefficient CV for each pair of first and second features. The second feature in the pair of first and second features is then added to the correlated feature set of merged group 350 when CV is >the CVT. If the computed CV is CVT, however, both the first and second features are added to the non-correlated feature set of merged group 350.

In more detail, the correlated features in correlated data sets 322a, 322b of merged group 330 are inserted into correlated data set 322e of merged group 350, while the correlated features in correlated data sets 322c, 322d of merged group 340 are inserted into correlated data set 322f of merged group 350. Similarly, the non-correlated features and the correlation coefficients in correlated data sets 322a, 322b of merged group 330 are inserted into correlated data set 322e of merged group 350, while the non-correlated features and the correlation coefficients in correlated data sets 322c, 322d of merged group 340 are inserted into correlated data set 322f of merged group 350. The process is repeated on the correlated data sets 322e, 322f of merged group 350 to generate a single correlated data set 360.

As seen in FIG. 3D, correlated data set 360 comprises a correlated feature set 362, a non-correlated feature set 364, and a correlation matrix 366. Once correlated data set 360 has been generated, any correlation coefficients in correlation matrix 366 that are associated with features in correlated feature set 362 are removed from correlation matrix 366. According to aspects of the present disclosure, the non-correlated features in the non-correlated feature set 364 will be used to build the model used to predict whether a given vehicle component should be removed.

FIG. 4 is a flow diagram illustrating a method 400 for predicting whether a given vehicle component should be removed according to one aspect of the present disclosure. Method 400 is implemented, in this aspect, in two phases by a computing device such computing device 210, but may be implemented by any computing device, or in some aspects, by multiple computing devices in a distributed network.

As seen in FIG. 4, in the first phase, a computing device 210 configured to implement method 400 first obtains input data 302 for a first vehicle component that was previously removed from vehicle 100, such as the aircraft illustrated in FIG. 1 (box 402). The input data 302 associates a set of features of the first vehicle component (e.g., TEMP, HUM, VEL, ALT, MODE, etc.) to corresponding sample values. In one aspect, the sample values were collected over time while the first vehicle component was still installed on vehicle (i.e., prior to its removal), and therefore, represent historical sample values. Then, based on that input data 302, the computing device generates correlation data set 312 (box 404). The correlation data set 312, as previously described, comprises both non-correlated features and correlated features. However, any features having sample values that are within a predetermined range of values are excluded from the correlation data set 312. In one example, a feature associated with a standard deviation value of 0 may be excluded from insertion into the correlation data set 312. In another example, however, any feature having a standard deviation of less than (or not greater than) 1 may be excluded from the correlation data set 312. The correlation data set 312 is then further processed, as previously described, to generate the single correlated data set 360.

Thus, whether a given feature is usable for predicting vehicle that a component should be removed from vehicle 100 depends, in part, on a variance in the sample values corresponding to that feature. Particularly, features having a variety of different sample values (i.e., have a standard deviation that exceeds a predetermined threshold) are useful for the prediction and maintained for further processing. Features having sample values that do not vary, or that have substantially little variance, are not useful for the prediction and are discarded.

Once correlated data set 360 is determined, computing device 210 generates a prediction model based on the non-correlated features in the non-correlated feature set 364, their corresponding sample values, which may be retrieved from the input data 302, and operational data associated with the first vehicle component (box 406). Such operational data may be obtained, for example, from a database in DB 204.

In the second phase, based on the generated prediction model, the implementing computing device 210 predicts whether a selected vehicle component 216 currently installed on the vehicle should be removed (box 408). According to the aspects of the present disclosure, the selected vehicle component 216 currently installed on the vehicle is of a same type of component as the first vehicle component. Based on the prediction, the computing device generates graphical user interface (GUI) 214 visually indicating the selected vehicle component 216 that is predicted to be removed and providing a recommendation 220 for addressing the predicted removal of the selected vehicle component 216 (box 410). The GUI 214 is then output to a display for a user (box 412).

FIG. 5 is a flow diagram illustrating a method 500 for processing input data 302 to generate correlated data set 360 according to one aspect of the present disclosure. The method 500 may also be implemented on a single computing device 210 or on multiple computing devices in a distributed network.

As seen in FIG. 5, method 500 calls for computing device 210 to generate the correlation data set 312 by partitioning the set of features in the input data 302 into one or more non-overlapping input data partitions 314, 316 (box 502). Then, for each input data partition 314, 316, method 500 calls for computing device 210 to determine one or more intra-partition feature pairs (box 504). Each intra-partition feature pair comprises two features in the input data partition 314, 316. Based on a number of features in the input data partitions 314, 316, method 500 calls for computing device to generate one or more input data partition pairs. The input data partition pairs are then merged into the correlation data set 312 (box 508).

Next, method 500 calls for computing device 210 to determine, for each input data partition pair, one or more cross-partition feature pairs (box 510). Each cross-partition feature pair comprises a feature from a first input data partition 314 of the cross-partition feature pair, and a second feature from a second input data partition 316 of the cross-partition feature pair. So determined, method 500 calls for the implementing computing device to merge the one or more cross-partition feature pairs into the correlated data set 360 (box 512). A check is then made to determine whether all partitions have been processed and merged into a single, final partition (box 514). If not, method 500 returns to box 506 and repeats the processing with the merged data sets until there is only a single, final merged partition (e.g., partition "G" in FIG. 3A).

FIGS. 6A-6B are flow diagrams illustrating a method 600 for generating the data used in predicting whether a vehicle component currently installed on a vehicle should be removed from the vehicle according to one aspect of the present disclosure. As seen in FIG. 6A, for each feature in the input data 302, method 600 first determines a mean and a standard deviation value for the feature based on that feature's corresponding sample values (box 602). If the computed standard deviation value exceeds a predetermined standard deviation threshold value (box 604), the feature is included in the correlation data set 312 (box 606). Otherwise, the feature is excluded from the correlation data set 312. Then, method 600 generates, from the correlation data set 312, a correlated data set 322 comprising a correlated feature set 324 that includes the correlated features, a non-correlated feature set 324 that includes the non-correlated features, and a correlation matrix 328 (box 610). In this aspect, each correlated feature in the correlated feature set is correlated with at least one other feature in the correlation data set 312. Further, each non-correlated feature in the non-correlated feature set is not correlated with any other feature in the correlation data set 312. The correlation matrix 326 comprises the correlation coefficients associated with the non-correlated features in the non-correlated feature set 324.

FIG. 6B is a flow diagram illustrating the generation of the correlated feature set 362, the non-correlated feature set 364, and the correlation matrix 366, according to one aspect. As seen in FIG. 6B, method 600 determines, for each pair of first and second features (e.g., TEM and VEL, ALT and MODE) in the correlation data set 312, a correlation coefficient for the first and second features (box 612). As previously described, the correlation coefficient indicates a relationship between the sample values of the first feature and the sample values of the second feature. If the correlation coefficient meets or exceeds a predetermined correlation threshold value (box 614), the second feature is included in the correlation feature set 362 (box 616). If the correlation coefficient is less than the predetermined correlation threshold value, the second feature is included in the non-correlated feature set 364 (box 618) and the correlation coefficient associated with the first and second features is included in the correlation matrix (box 620). This process continues until all feature pairs have been processed and included in either the correlated feature data set 362 or the non-correlated feature data set 364 (box 622). In one aspect, the correlated data set 360, including the correlated feature set 362, the non-correlated feature set 364, and the correlation matrix 366, are stored in memory (box 624).

FIGS. 6A-6B illustrated a method 600 for implementing the first phase of the present disclosure according to one aspect. FIG. 6C then illustrates a method 630 for implementing a second phase of the present disclosure. In this phase, method 630 predicts whether a given vehicle component currently installed on vehicle 100 will experience a fault and should be removed from vehicle 100.

As seen in FIG. 6C, the correlated data set 360, including the corresponding correlation matrix 366, is obtained from memory (box 632). A non-correlated feature is then selected from the non-correlated feature set 364 (box 634). In this aspect, selection is based on the correlation coefficients stored in the correlation matrix 366. A prediction is then made as to whether the selected vehicle component 216 should be removed based on the sample values for the selected non-correlated feature (box 636). In one aspect, the non-correlated feature set 364 comprises only a label or other descriptive indicator identifying the non-correlated features. In such cases, the sample values for the selected non-correlated feature would be obtained from the input data 302. In other aspects, however, the non-correlated feature set 364 is generated to also include the sample values for the non-correlated features.

As stated above, and as seen in method 700 of FIG. 7, computing device 210 generates a classification model based on the sample values associated with one or more of the non-correlated features in the non-correlated feature set 364 (box 702). In one aspect, at least one of these non-correlated features includes the selected non-correlated feature. The generated classification model may be any type of classification model needed or desired. Some example types include, but are not limited to, support vector machine (SVM) models, logistic regression models, decision tree models, random forest models, gradient-boosted tree models, multilayer perceptron models, one-vs-rest models, and Naive Bayes models. Additionally, the present disclosure is not limited to generating only a single type of model. In some aspects, multiple types of classification models are generated. Regardless of the number and/or type of classification model that is generated, however, the generated classification mode(s) are stored in a memory, such as in DB 204 (box 704). The output of the model is then used by the computing device to predict whether a selected vehicle component 216 should be removed.

FIG. 8 is a flow diagram illustrating a method 800 for generating a GUI graphically indicating to a user that a selected vehicle component 216 should be removed from vehicle 100. As seen in FIG. 8, a visual representation of the vehicle 100 is generated (box 802). The visual representation graphically indicates the selected vehicle component 216 predicted to be removed as well as the location of the selected vehicle component 216 on the vehicle 100. Additionally, a recommendation 220 for addressing the predicted removal of the selected vehicle component 216 is also determined (box 804). By way of example only, recommendation 220 may indicate that the selected vehicle component 216 is predicted to be removed from vehicle 100, and that it should be, for example, removed, replaced, or rebuilt. The recommendation 220 may comprise graphical indicators 218 as well, such as graphs and other visual or graphical information related to the health and/or predicted removal of the selected vehicle component 216, and a link to a particular manual and/or section of a manual comprising detailed information for removing, replacing, and/or rebuilding the selected vehicle component 216. Such information may be obtained, for example, from one or more of the DBs 204.

FIG. 9 is a schematic block diagram illustrating a computer device 210 configured to predict whether a vehicle component currently installed on vehicle 100 should be removed from vehicle 100 according to aspects of the present disclosure. As seen in FIG. 9, computing device 210, which may be one or more network-based computer servers, for example, comprises processing circuitry 900, memory circuitry 902, and communications circuitry 904. One or more control programs 906 comprising instructions for controlling the computing device 210 to implement the present aspects may be stored in memory circuitry 902. Additionally, although not specifically illustrated here, computing device 210 may also comprise one or more user input/output devices (e.g., a keyboard, a mouse, one or more display devices, etc.) to facilitate user interaction with the computing device.

According to various aspects of the present disclosure, processing circuitry 900 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 900 includes programmable hardware capable of executing software instructions stored, e.g., as a machine-readable computer control program 906 in memory circuitry 902.

More particularly, processing circuitry 900 is configured to execute the control program 906 to obtain the input data 302 for a first vehicle component previously removed from a vehicle, generate a correlation data set 312 that comprises non-correlated features and correlated features and excludes features having sample values that are within a predetermined range of values, and generate a prediction model based on the non-correlated features in the correlation data set 312, their corresponding sample values, and operational data associated with the first vehicle component. Additionally, processing circuitry 900 is configured to execute the control program 906 to use the prediction model to predict that a selected vehicle component 216 currently installed on the vehicle should be removed and generate a graphical user interface (GUI) visually indicating the selected vehicle component 216 and providing a recommendation for addressing the predicted removal of the selected vehicle component 216 for output to a user, as previously described.

Memory circuitry 902 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 9, memory circuitry 902 comprises the circuitry configured to store control program 906, as previously described.

Communications circuitry 904 comprises circuitry configured to facilitate the sending and receiving of data and information between the computing device and one or more other devices via communications networks 202. Such devices include, but are not limited to, DB 204, user input terminal 206, sensors 208, and user output terminal 212. In some aspects, the data and information are communicated via data packets, and thus, communications circuitry 904 comprises, in at least one aspect, an ETHERNET card. However, those of ordinary skill in the art will readily appreciate that other data packet communication technologies can also be used.

FIG. 10 a schematic block diagram illustrating a computer program product for predicting vehicle component removal according to one aspect of the present disclosure. The computer program product may be, for example, the one or more control programs 906 stored on memory circuitry 902 and executed by processing circuitry 900.

As seen in FIG. 10, processing circuitry 900 implements the one or more control programs 906 according to different hardware units and software modules. Such units and modules include, but are not limited to, an input data obtaining unit/module 1000, a correlation data set generating unit/module 1002, a prediction model generating unit/module 1004, a component removal prediction unit/module 1006, a recommendation determination unit/module 1008, a visual representation generation unit/module 1010, and a graphical user interface (GUI) generation unit/module 1012.

The input data obtaining unit/module 1000 comprises code and instructions that, when executed by processing circuitry 900, configure the computing device 210 to obtain input data 302 for a first vehicle component previously removed from a vehicle, as previously described. As stated above, the input data associates a set of features of the first vehicle component to corresponding sample values.

The correlation data set generating unit/module 1002 comprises code and instructions that, when executed by processing circuitry 900, configure the computing device to generate, from the input data, a correlation data set to comprise the non-correlated features and correlated features, but exclude features having sample values that are within a predetermined range of values, as previously described.

The prediction model generating unit/module 1004 comprises code and instructions that, when executed by processing circuitry 900, configure the computing device to generate a prediction model based on the non-correlated features in the correlation data set, their corresponding sample values, and operational data associated with the first vehicle component, as previously described.

The component removal prediction unit/module 1006 comprises code and instructions that, when executed by processing circuitry 900, configure the computing device to predict that a selected vehicle component 216 currently installed on the vehicle should be removed based on the prediction model generated by the prediction model generating unit/module 1004, as previously described.

The recommendation determination unit/module 1008 comprises code and instructions that, when executed by processing circuitry 900, configure the computing device to determine a recommendation for addressing the predicted removal of the selected vehicle component 216, as previously described.

The visual representation generation unit/module 1010 comprises code and instructions that, when executed by processing circuitry 900, configure the computing device to generate the visual representation of the vehicle 100 indicating the selected vehicle component 216, as previously described.

The graphical user interface (GUI) generation unit/module 1012 comprises code and instructions that, when executed by processing circuitry 900, configure the computing device to generate the GUI for the generated visual representation of vehicle 100, and to output the GUI to a display for a user, as previously described.

The aspects previously described illustrate the present aspects in the context of vehicle 100 being an aircraft. However, as stated above and as understood by those of ordinary skill in the art, the present aspects are not so limited. FIG. 11, for example, illustrates some additional example vehicles that may be configured for predicting component removal according to aspects of the present disclosure. Such vehicles include, for example, spacecraft 1100, submersible craft 1102, such as a submarine, for example, vehicles such as automobiles 1104 that utilize fossil fuels, rotorcraft 1106, and surface craft 1108 such as boats. Additionally, although not specifically shown in FIG. 11, vehicle 100 may be an unmanned and/or remotely controlled aircraft.

Additionally, the previously described aspects of the present disclosure illustrate GUI 214 as providing a graphical representation of the data generated by the component prediction removal model. While some aspects do provide such a GUI 214, the present disclosure is not so limited. The data generated by the component removal prediction model may be provided to a user in other ways in addition to, or in lieu of, a graphical representation on GUI 214.

By way of example only, one aspect of the present disclosure sends the data generated by the component removal prediction model to memory for storage, such as one or more of the DBs 204. In these aspects, the present disclosure may generate a file comprising data that identifies the selected vehicle component to be removed and the recommendation for addressing the predicted removal of the selected vehicle component. In some cases, the data may also identify the particular vehicle on which the selected component is currently installed, as well as a recommended time-range within which the selected component should be removed. In one aspect, the file that is generated and stored can be obtained by computing device 210 for subsequent analysis and display on GUI 214.

In at least one aspect, the present disclosure provides the data generated by the component removal prediction model to a technician or other appropriate operator (e.g., a maintenance supervisor). By proactively providing such information, the technician or operator is made aware of the predicted removal and the recommendation for addressing that component removal quickly and easily. So informed, the technician can check the vehicle component and/or effect the removal/replacement of the selected vehicle component as needed.

In other aspects, the present disclosure sends the data generated by the component prediction removal model to a maintenance/parts inventory system. Sending the output generated by the component removal prediction model, in at least one aspect, autonomously controls such systems to obtain a replacement component part from inventory and send that part to a location where maintenance personnel can use it to replace the selected vehicle component being removed. This aspect greatly reduces the time and costs associated with removing and replacing vehicle components and helps to ensure that the proper vehicle component is provided for the replacement.

In at least one aspect, the output data generated by the component removal prediction model is provided to a control system. Such aspects can be especially beneficial for vehicles that are in transit. By way of example only, consider an aircraft currently in flight. Because the present aspects may be implemented independently of the particular operational mode of the aircraft, it is possible that computing device 210 provides a recommendation for replacing a selected vehicle component while the aircraft is in flight.

Provided with such information, the control system can identify a destination (e.g., another airport) that has an appropriate replacement component, and re-route the aircraft to that destination. This allows maintenance personnel to quickly and easily implement the predicted/recommended removal of the selected vehicle component.

Computing device 210 may also reroute the aircraft through a series of one or more flights to a number of airports so that maintenance personnel may quickly and easily implement the predicted/recommended removal of the selected vehicle component at one of those airports. In one aspect, for example, computing device 210 is configured to alert a flight scheduler. In response, the flight scheduler may reroute the aircraft through the series of flights to any of a variety of different airports so that the maintenance personnel may quickly and easily implement the predicted/recommended removal of the selected vehicle component.

Computing devices configured to operate according to the present embodiments provide benefits and functions that conventional methods either do not, or cannot, provide. For example, although many conventional techniques are designed to process a relatively large number of samples per feature, they can only handle a moderate number of features. The limited number of features, however, limits the amount of information that can be considered during processing, thereby limiting the ability of conventional techniques to accurately predict component removal. However, not only does a computing device configured according to the present aspects have the ability to process a large number of sample values per feature, it can also process a large number of features. This is possible, in part, because of the parallel processing techniques and the early filtering techniques employed by the present aspects. Particularly, as described previously, the present aspects "filter out" (i.e., remove) features with zero standard deviation at the beginning of the process. Then, the present aspects identify all the correlated features (i.e., the present aspects "grow" the correlated feature set) so that only the non-correlated features are used during the cross-partition feature correlation calculations.

Additionally, when determining whether the features are correlated or non-correlated, the disclosed parallel computing technique determines both intra-pair correlation and inter-pair correlation. Further, the disclosed parallel computing technique carefully balances the computational loads and fully leverages the available computation power.

Typically, historical data indicates that many of the features are highly correlated with at least one other feature. However, this tends to increase time required by conventional techniques to process the features and their sample values. A computing device configured according to the present aspects, however, functions best when there are a large number of highly correlated features. Particularly, aspects of the present disclosure identify the correlated features and "filter" them out of the processing at a very early stage. This removes the correlated features from any downstream machine learning processes (e.g., such as when the classification model is generated) and significantly reduces the overall computational costs.

Moreover, aspects of the present disclosure reduce the computational costs by shrinking the size of the input data. For example, consider a situation where $M_I$ input features provide an expected $M_O$ output features (i.e., those features surviving a filtering threshold). An exact algorithm would need to calculate the pairwise correlations in the $M_O$ output features. Native algorithms, such as those used by conventional methods, will compute $O(M_I^2)$ correlations even though only $O(M_O^2)$ calculations are needed. Due to the early filtering described herein, however, aspects of the present disclosure reduce the number of computations needed significantly towards $O(M_O^2)$. This particular difference is especially beneficial. For example, if an expected feature reduction rate is 10 times, the early filtering of the present aspects will reduce the computations needed for processing the input data by 100 times.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A computing device for predicting that a component currently installed on a vehicle should be removed from the vehicle, the computing device comprising:

processing circuitry; and memory comprising instructions executable by the processing circuitry whereby the computing device is configured to:

obtain input data for a first vehicle component previously removed from a vehicle, the input data associating a set of features of the first vehicle component to corresponding sample values;

generate, from the input data, a correlation data set comprising correlated features, non-correlated features, and a correlation matrix comprising correlation coefficients associated with the non-correlated features, and that excludes features having sample values that are within a predetermined range of values, wherein to generate the correlation data set, the processing circuitry is configured to:

partition the set of features in the input data into a plurality of non-overlapping input data partitions;

for each input data partition, determine one or more intra-partition feature pairs, wherein each intra-partition feature pair comprises two features in the input data partition;

generate one or more input data partition pairs based on a number of features in the input data partitions; and merge the one or more input data partition pairs into the correlation data set;

remove, from the correlation matrix, any correlation coefficients that are associated with the correlated features in the correlation data set;

generate a prediction model based on the non-correlated features in the correlation data set, their corresponding sample values, and operational data associated with the first vehicle component;

predict that a selected vehicle component currently installed on the vehicle should be replaced based on the prediction model;

generate a graphical user interface (GUI) visually indicating the selected vehicle component and providing a recommendation for addressing the predicted replacement of the selected vehicle component, wherein to generate the GUI, the computing device is configured to generate:

a visual representation of the vehicle graphically indicating the selected vehicle component and a location of the selected vehicle component on the vehicle;

one or more graphical indicators graphically representing one or more faults experienced by the selected vehicle component; and a selectable link that, when selected by a user, controls the computing device to display a section of a manual describing a process for removing and/or replacing the selected vehicle component; and output the GUI to a display for a user.

2. The computing device of claim 1 further comprising:

for each input data partition pair, determine one or more cross-partition feature pairs, wherein each cross-partition feature pair comprises a feature from a first input data partition of the cross-partition feature pair, and a second feature from a second input data partition of the cross-partition feature pair; and merge the one or more cross-partition feature pairs into the correlation data set.

3. The computing device of claim 1 wherein to generate the correlation data set from the input data, the processing circuitry is configured to:

for each feature in the input data:

determine a mean and a standard deviation value for the feature based on the corresponding sample values; and include the feature in the correlation data set based on a comparison of the standard deviation value to a predetermined standard deviation threshold value.

4. The computing device of claim 3 wherein the processing circuitry is configured to:

include the feature in the correlation data set when the standard deviation value determined for the feature exceeds the predetermined standard deviation threshold value; and exclude the feature from the correlation data set when the standard deviation value determined for the feature does not exceed the predetermined standard deviation threshold value.

5. The computing device of claim 3 wherein the processing circuitry is further configured to generate, from the correlation data set:

a correlated feature set comprising the correlated features, wherein each correlated feature in the correlated feature set is correlated with at least one other feature in the correlation data set;

a non-correlated feature set comprising the non-correlated features, wherein each non-correlated feature in the non-correlated feature set is not correlated with any other feature in the correlation data set; and the correlation matrix comprising the correlation coefficients associated with the non-correlated features in the non-correlated feature set.

6. The computing device of claim 5 wherein to generate, from the correlation data set, the correlated feature set, the non-correlated feature set, and the correlation matrix, the processing circuitry is configured to:

for each pair of first and second features in the correlation data set:

determine a correlation coefficient for the first and second features, wherein the correlation coefficient indicates a relationship between the corresponding sample values of the first feature and the corresponding sample values of the second feature;

if the correlation coefficient meets or exceeds a predetermined correlation threshold value, include the second feature in the correlated feature set; and if the correlation coefficient is less than the predetermined correlation threshold value:
  include the second feature in the non-correlated feature set; and
  include the correlation coefficient associated with the first and second features in the correlation matrix.

7. The computing device of claim 5 wherein to predict that the selected vehicle component should be removed, the processing circuitry is further configured to:
  select a non-correlated feature from the non-correlated feature set based on the correlation coefficient associated with the non-correlated feature; and
  predict that the selected vehicle component should be removed from the vehicle based on the sample values for the selected non-correlated feature.

8. The computing device of claim 1 wherein the processing circuitry is configured to:
  generate a classification model based on the sample values associated with one or more of the non-correlated features; and
  store the classification model in a memory.

9. The computing device of claim 8 wherein the processing circuitry is configured to predict that the selected vehicle component should be removed from the vehicle based on an output of the classification model.

10. The computing device of claim 1 wherein to generate the GUI visually indicating the selected vehicle component, the processing circuitry is configured to determine the recommendation for addressing the predicted replacement of the selected vehicle component.

11. The computing device of claim 1 wherein the selected vehicle component and the first vehicle component are of a same type of vehicle component.

12. A method for predicting that a component currently installed on a vehicle should be removed from the vehicle, the method comprising:
  obtaining input data for a first vehicle component previously removed from a vehicle, the input data associating a set of features of the first vehicle component to corresponding sample values;
  generating, from the input data, a correlation data set comprising correlated features, non-correlated features, and a correlation matrix comprising correlation coefficients associated with the non-correlated features, and that excludes features having corresponding sample values that are within a predetermined range of values, wherein generating the correlation data set comprises:
    partitioning the set of features in the input data into a plurality of non-overlapping input data partitions;
    for each input data partition, determining one or more intra-partition feature pairs, wherein each intra-partition feature pair comprises two features in the input data partition;
    generating one or more input data partition pairs based on a number of features in the input data partitions; and
    merging the one or more input data partition pairs into the correlation data set;
  removing, from the correlation matrix, any correlation coefficients that are associated with the correlated features in the correlation data set;
  generating a prediction model based on the non-correlated features in the correlation data set, their corresponding sample values, and operational data associated with the first vehicle component;

predicting that a selected vehicle component should be removed from the vehicle based on the prediction model; and
generating a graphical user interface (GUI) visually indicating the selected vehicle component and providing a recommendation for addressing the predicted removal of the selected vehicle component, wherein generating a graphical user interface (GUI) visually indicating the selected vehicle component comprises generating:
  a visual representation of the vehicle graphically indicating the selected vehicle component and a location of the selected vehicle component on the vehicle;
  one or more graphical indicators graphically representing one or more faults experienced by the selected vehicle component; and
  a selectable link that, when selected by a user, controls a computing device to display a section of a manual describing a process for removing and/or replacing the selected vehicle component; and
outputting the GUI to a display for a user.

13. The method of claim 12 further comprising:
for each input data partition pair, determining one or more cross-partition feature pairs, wherein each cross-partition feature pair comprises a feature from a first input data partition of the cross-partition feature pair, and a second feature from a second input data partition of the cross-partition feature pair; and
merging a first merged data set and the one or more cross-partition feature pairs to generate the correlation data set.

14. The method of claim 13 wherein generating the correlation data set from the input data comprises:
for each feature in the input data:
  determining mean and standard deviation values for the feature based on the corresponding sample values; and
  including the feature in the correlation data set based on a comparison of the standard deviation value to a predetermined standard deviation threshold value.

15. The method of claim 14 wherein generating the correlation data set further comprises:
including the feature in the correlation data set when the standard deviation value determined for the feature exceeds the predetermined standard deviation threshold value; and
excluding the feature from the correlation data set when the standard deviation value determined for the feature does not exceed the predetermined standard deviation threshold value.

16. The method of claim 14 further comprising generating, from the correlation data set:
  a correlated feature set comprising the correlated features, wherein each correlated feature in the correlated feature set is correlated with at least one other feature in the correlation data set;
  a non-correlated feature set comprising the non-correlated features, wherein each non-correlated feature in the non-correlated feature set is not correlated with any other feature in the correlation data set; and
  the correlation matrix comprising the correlation coefficients associated with the non-correlated features in the non-correlated feature set.

17. The method of claim 16 wherein generating, from the correlation data set, the correlated feature set, the non-correlated feature set, and the correlation matrix, comprises:
  for each pair of first and second features in the correlation data set:

determining a correlation coefficient for the first and second features, wherein the correlation coefficient indicates a relationship between the sample values of the first feature and the sample values of the second feature;

if the correlation coefficient meets or exceeds a predetermined correlation threshold value, including the second feature in the correlated feature set; and if the correlation coefficient is less than the predetermined correlation threshold value:

including the second feature in the non-correlated feature set; and including the correlation coefficient into the correlation matrix.

18. The method of claim 16 wherein predicting that the selected vehicle component should be removed comprises:

selecting a non-correlated feature from the non-correlated feature set based on the correlation coefficient associated with the non-correlated feature; and predicting that the selected vehicle component should be removed from the vehicle based on the sample values for the selected non-correlated feature.

19. The method of claim 12 further comprising:

generating a classification model based on the sample values associated with one or more of the non-correlated features; and storing the classification model in a memory.

20. The method of claim 19 wherein predicting that the selected vehicle component should be removed is based on an output of the classification model.

21. The method of claim 12 wherein generating a graphical user interface (GUI) visually indicating the selected vehicle component further comprises determining the recommendation for addressing the predicted removal of the selected vehicle component.

22. A non-transitory computer readable medium comprising instructions stored thereon that, when executed by processing circuitry of a computing device, configures the computing device to:

obtain input data for a first vehicle component previously removed from a vehicle, the input data associating a set of features of the first vehicle component to corresponding sample values;

generate, from the input data, a correlation data set comprising correlated features, non-correlated features, and a correlation matrix comprising correlation coefficients associated with the non-correlated features, and that excludes features having sample values that are within a predetermined range of values, wherein to generate the correlation data set, the processing circuitry is configured to:

partition the set of features in the input data into a plurality of non-overlapping input data partitions;

for each input data partition, determine one or more intra-partition feature pairs, wherein each intra-partition feature pair comprises two features in the input data partition;

generate one or more input data partition pairs based on a number of features in the input data partitions; and merge the one or more input data partition pairs into the correlation data set;

remove, from the correlation matrix, any correlation coefficients that are associated with the correlated features in the correlation data set;

generate a prediction model based on the non-correlated features in the correlation data set, their corresponding sample values, and operational data associated with the first vehicle component;

predict that a selected vehicle component currently installed on the vehicle should be removed and/or replaced from the vehicle based on the prediction model;

generate a graphical user interface (GUI) visually indicating the selected vehicle component and providing a recommendation for addressing the predicted replacement and/or removal of the selected vehicle component, wherein to generate the GUI, the computing device is configured to:

generate a visual representation of the vehicle graphically indicating the selected vehicle component and a location of the selected vehicle component on the vehicle;

generate one or more graphical indicators graphically representing one or more faults experienced by the selected vehicle component; and generate a selectable link that, when selected by a user, controls the computing device to display a section of a manual describing a process for removing and/or replacing the selected vehicle component; and output the GUI to a display for a user.

23. The computing device of claim 1 wherein the one or more graphical indicators graphically comprise one or more graphs and/or diagrams representing the one or more faults experienced by the selected vehicle component.

24. The computing device of claim 1, wherein the processing circuitry is further configured to provide the recommendation for addressing the predicted replacement of the selected vehicle component to a control system for a vehicle that is in transit, the control system being configured to reroute the vehicle to a destination for removal and/or replacement of the selected vehicle component.

25. The computing device of claim 1, wherein the vehicle comprises an aircraft.

* * * * *